(12) United States Patent
Kaufman

(10) Patent No.: US 10,315,742 B2
(45) Date of Patent: Jun. 11, 2019

(54) HIGH EFFICIENCY, LOW RPM, UNDERWATER PROPELLER

(71) Applicant: Aurora Flight Sciences Corporation, Manassas, VA (US)

(72) Inventor: Amanda Kaufman, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 56 days.

(21) Appl. No.: 15/682,938

(22) Filed: Aug. 22, 2017

(65) Prior Publication Data

US 2019/0061891 A1    Feb. 28, 2019

(51) Int. Cl.
     *B63H 1/26*      (2006.01)
     *B63G 8/00*      (2006.01)
     *B63H 21/17*      (2006.01)

(52) U.S. Cl.
     CPC .............. *B63H 1/26* (2013.01); *B63G 8/001* (2013.01); *B63H 21/17* (2013.01); *B63B 2702/04* (2013.01); *B63G 2008/002* (2013.01)

(58) Field of Classification Search
     CPC ... B63H 1/00; B63H 1/14; B63H 1/16; B63H 1/18; B63H 1/20; B63H 1/26; B63H 1/28; B64C 3/26
     USPC ............................ 440/49; 416/235, 238, 243
     See application file for complete search history.

(56) References Cited

U.S. PATENT DOCUMENTS

| | | | |
|---|---|---|---|
| 342,011 A | 5/1886 | Hoehle | |
| 1,786,644 A | 12/1930 | Davis | |
| 2,938,585 A | 5/1960 | Fanti | |
| 3,128,829 A | 4/1964 | Young | |
| 3,385,374 A | 5/1968 | Kaplan et al. | |
| 3,829,240 A * | 8/1974 | Edenborough | B64C 27/46 416/223 R |
| 4,642,028 A | 2/1987 | Buckman et al. | |
| 4,802,822 A | 2/1989 | Gilgenbach et al. | |
| 4,836,748 A | 6/1989 | Church | |
| 5,104,292 A | 4/1992 | Koepsel et al. | |
| 5,114,313 A | 5/1992 | Vorus | |
| 5,464,321 A | 11/1995 | Williams et al. | |
| 5,727,381 A | 3/1998 | Rogers | |
| 6,497,385 B1 * | 12/2002 | Wachspress | B64C 27/28 416/223 R |
| 7,637,722 B1 | 12/2009 | Koepsel et al. | |
| 2005/0233654 A1 * | 10/2005 | Mueller | B63H 3/008 440/49 |
| 2011/0052400 A1 * | 3/2011 | Khan | F03D 1/0608 416/223 R |
| 2013/0045107 A1 | 2/2013 | Topaz et al. | |

FOREIGN PATENT DOCUMENTS

EP      2311726      4/2011

* cited by examiner

*Primary Examiner* — Lars A Olson
(74) *Attorney, Agent, or Firm* — Michael Stanley Tomsa; McAndrews, Held & Malloy, Ltd.; Eugene H. Nahm

(57) ABSTRACT

A marine propeller is disclosed having two blades. The shape of the propeller blades remains constant through the radial position of the propeller blades. The blade length of the propeller blades changes as a function of the radial position of the propeller blade. The twist angle of each blade starts at approximately 63 degrees at the propeller hub (proximal end) and decreases to about 15 degrees at the blade tip (distal end).

20 Claims, 21 Drawing Sheets

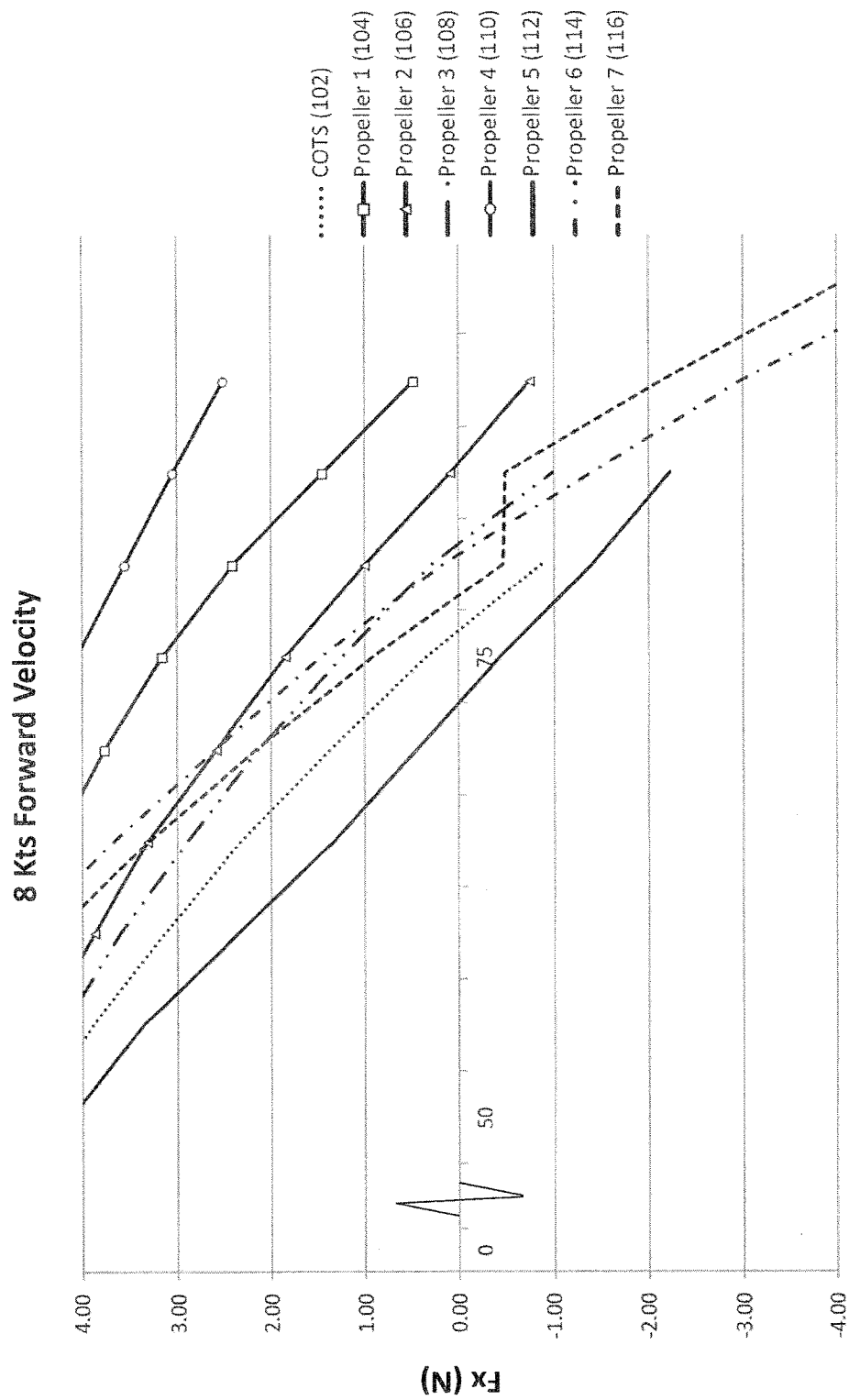

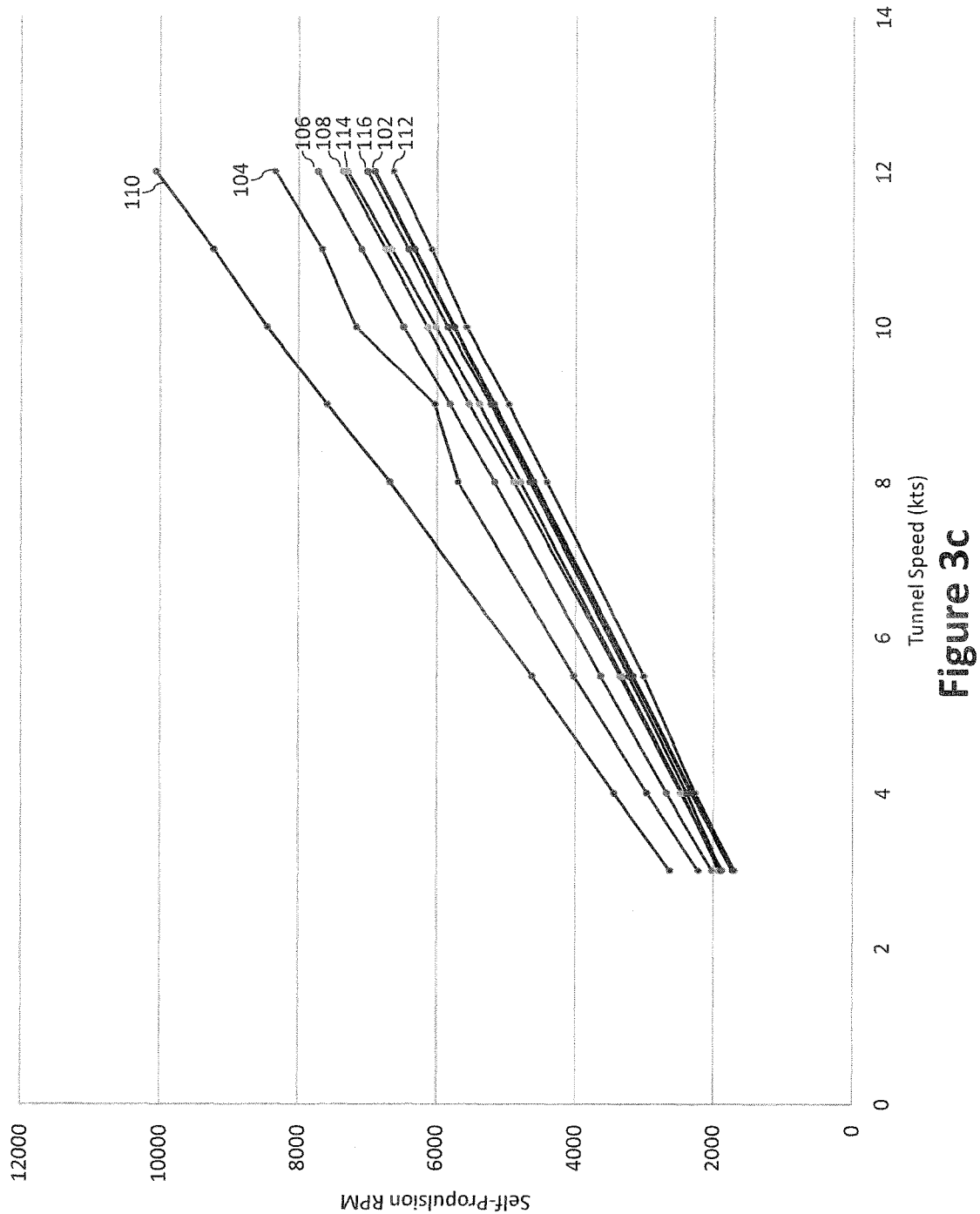

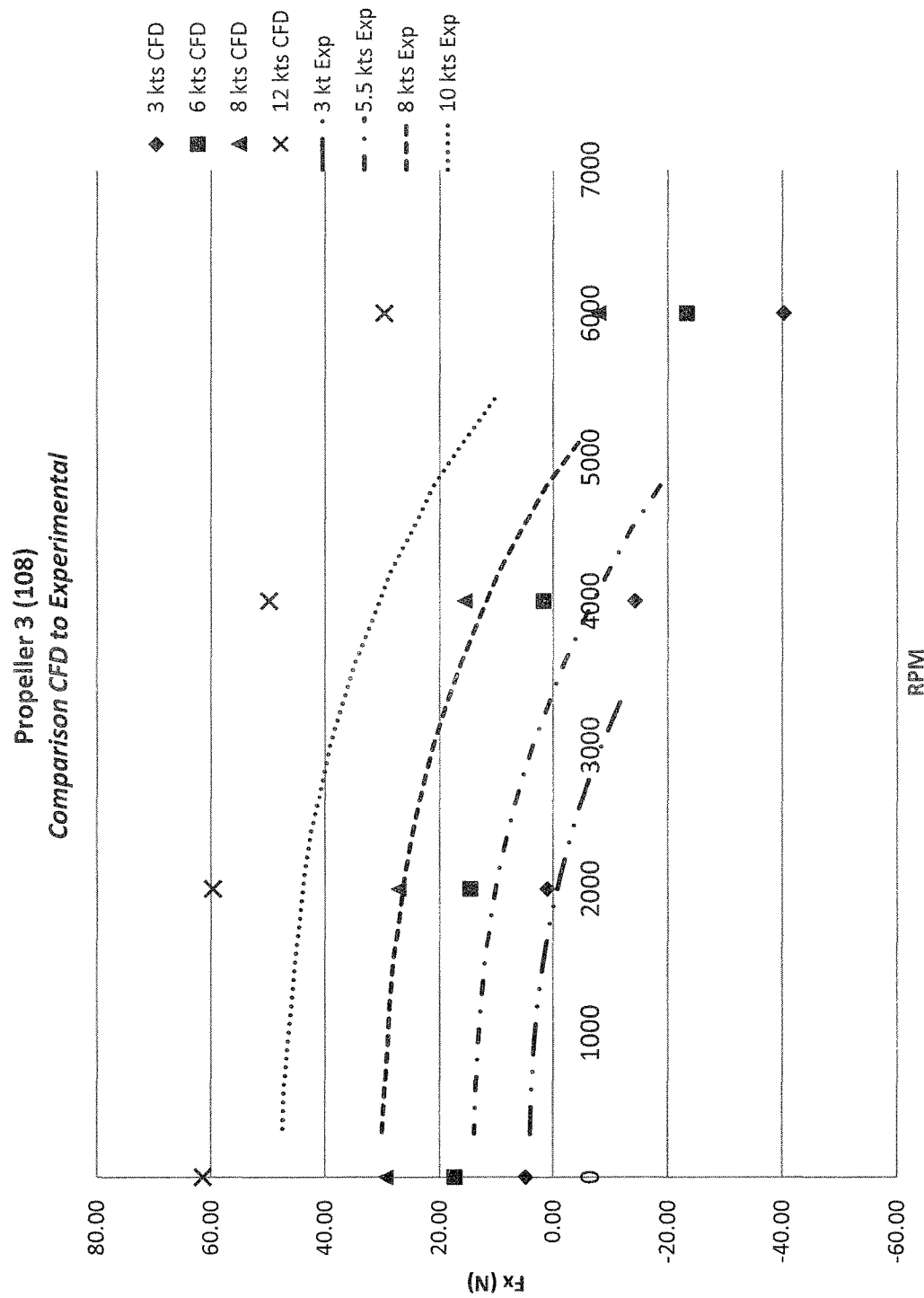

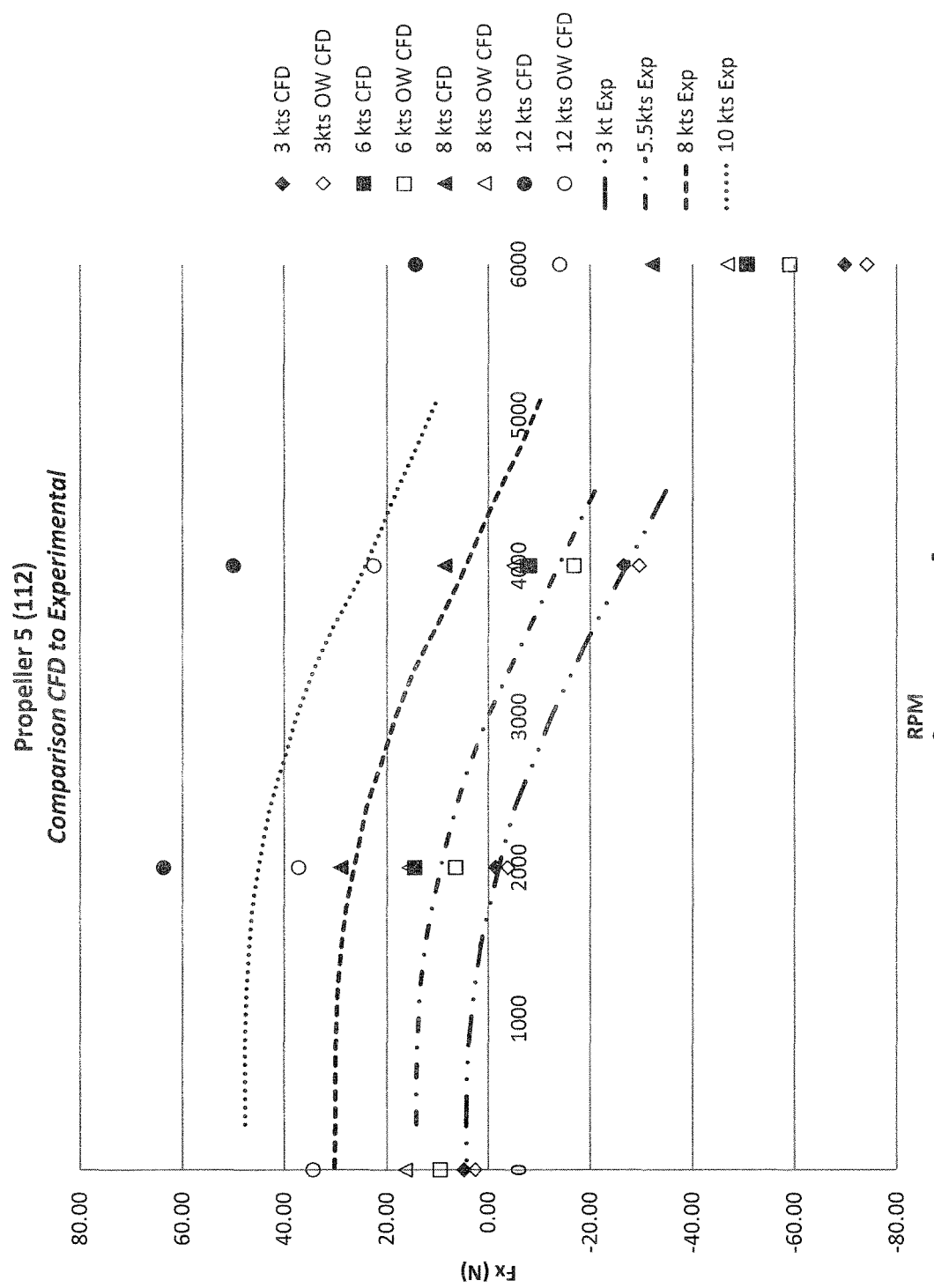

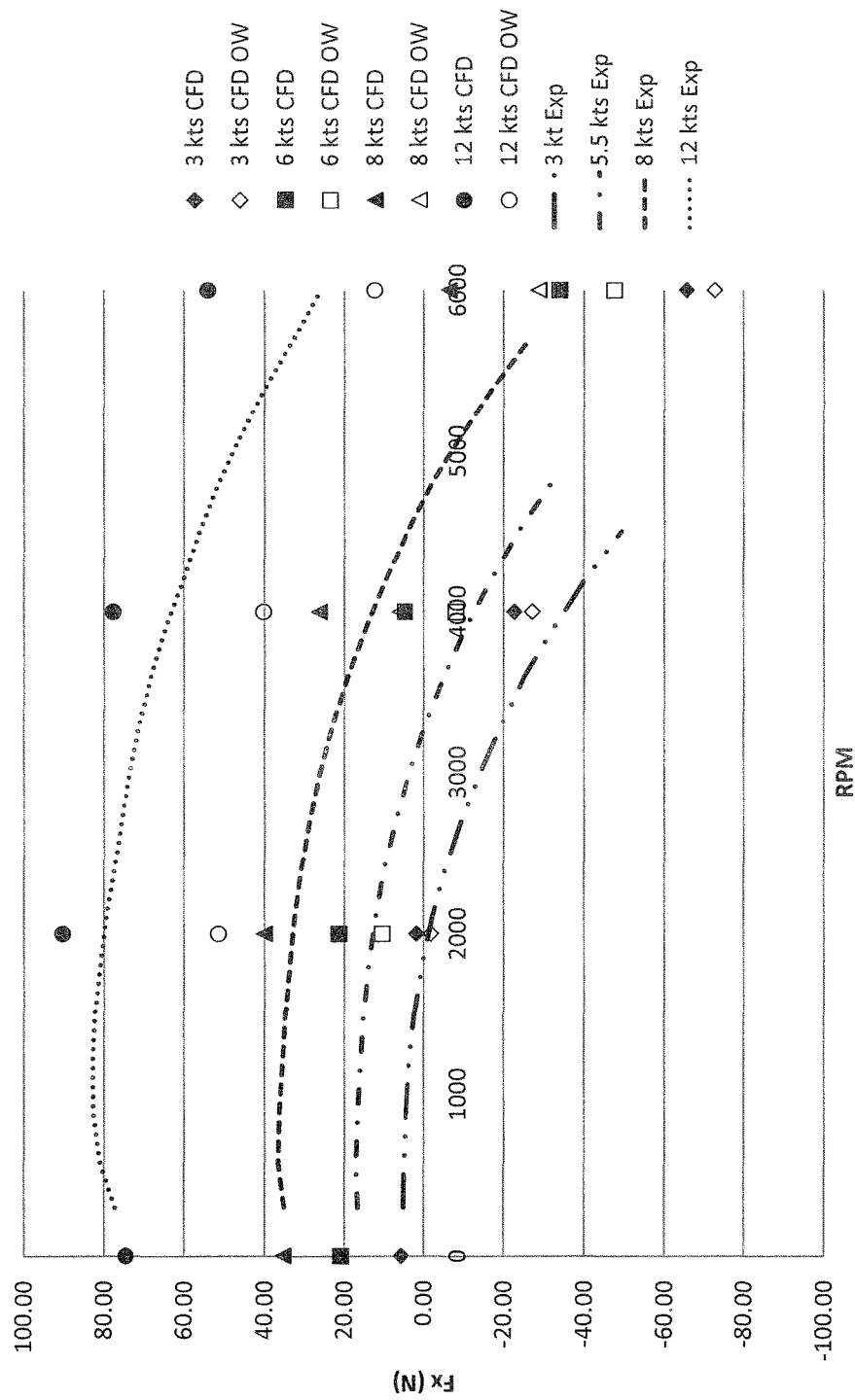

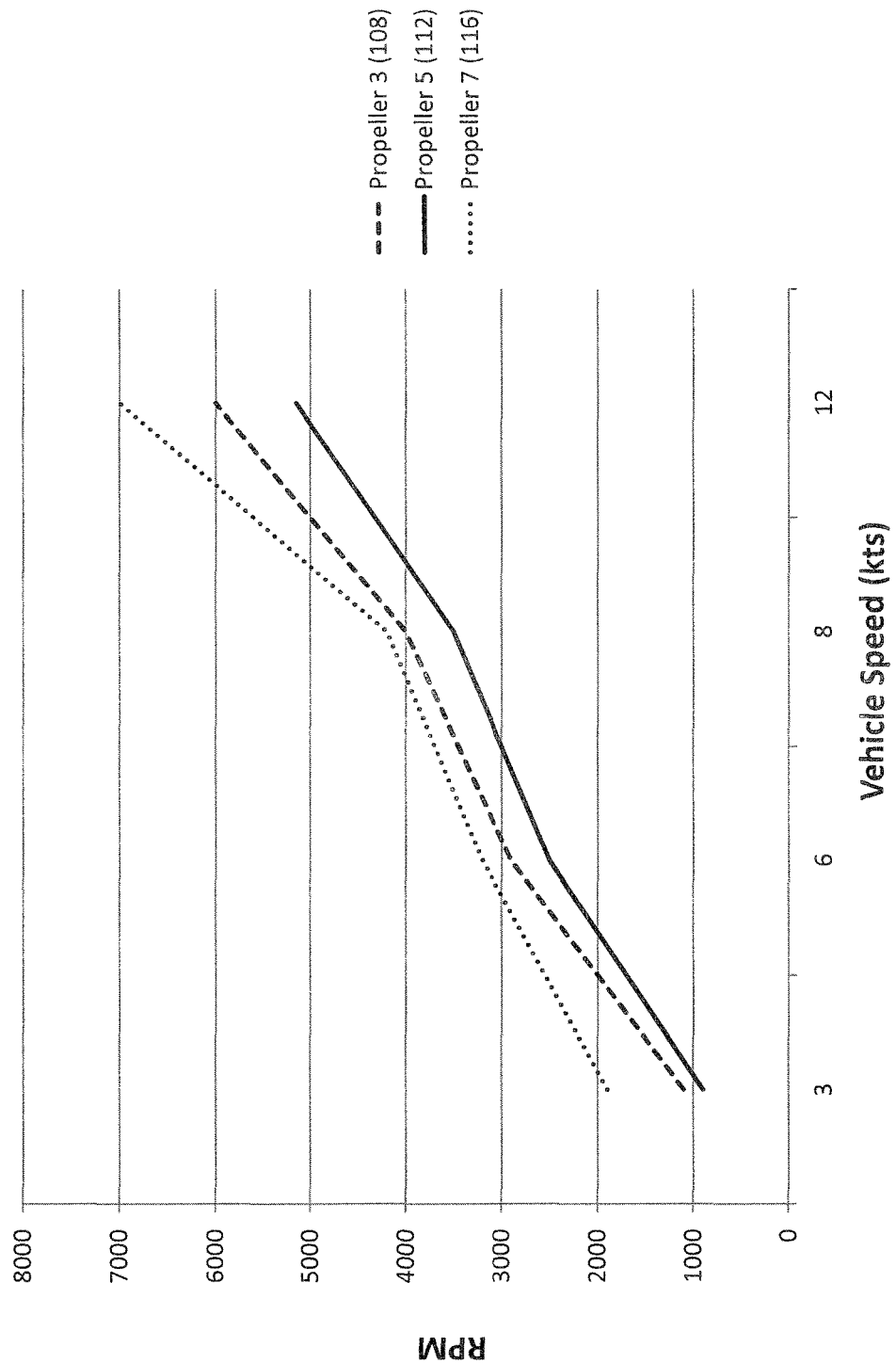

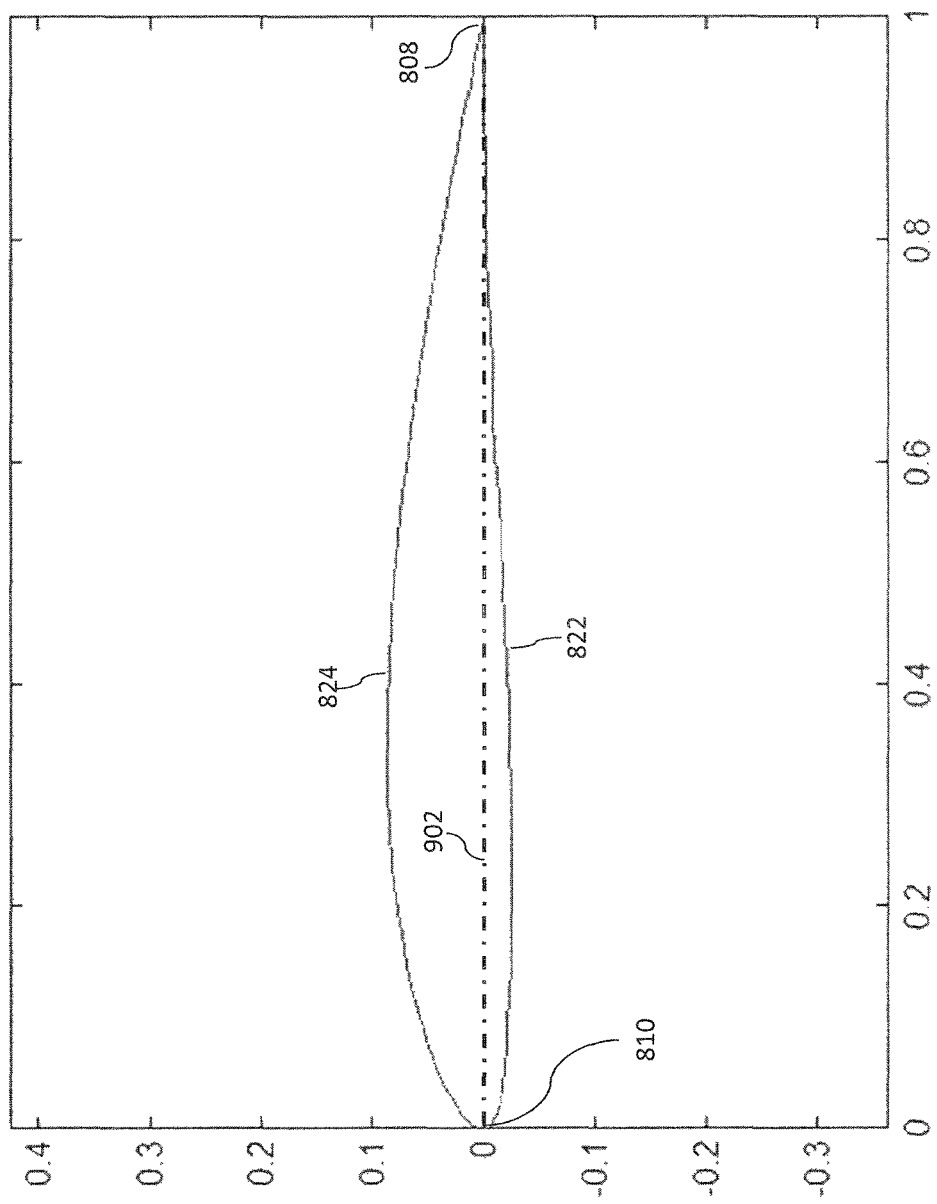

| r/R | c/R | Twist ∠ |
|---|---|---|
| 0.13541 | 0.31596 | 63.228 |
| 0.15349 | 0.31368 | 60.129 |
| 0.18462 | 0.31479 | 55.223 |
| 0.22330 | 0.31689 | 49.862 |
| 0.26590 | 0.31638 | 44.805 |
| 0.31042 | 0.31200 | 40.338 |
| 0.35574 | 0.30406 | 36.508 |
| 0.40116 | 0.29336 | 33.261 |
| 0.44623 | 0.28071 | 30.520 |
| 0.49062 | 0.26677 | 28.201 |
| 0.53406 | 0.25203 | 26.236 |
| 0.57635 | 0.23685 | 24.563 |
| 0.61731 | 0.22150 | 23.134 |
| 0.65677 | 0.20617 | 21.910 |
| 0.69461 | 0.19100 | 20.857 |
| 0.73067 | 0.17609 | 19.952 |
| 0.76486 | 0.16152 | 19.171 |
| 0.79706 | 0.14734 | 18.497 |
| 0.82716 | 0.13357 | 17.917 |
| 0.85508 | 0.12025 | 17.418 |
| 0.88072 | 0.10736 | 16.990 |
| 0.90403 | 0.09490 | 16.624 |
| 0.92492 | 0.08286 | 16.314 |
| 0.94333 | 0.07121 | 16.055 |
| 0.95921 | 0.05993 | 15.841 |
| 0.97252 | 0.04900 | 15.668 |
| 0.98321 | 0.03842 | 15.533 |
| 0.99126 | 0.02828 | 15.434 |
| 0.99663 | 0.01901 | 15.369 |
| 0.99933 | 0.01248 | 15.337 |

Figure 11a

HIGH EFFICIENCY, LOW RPM, UNDERWATER PROPELLER

STATEMENT OF GOVERNMENT INTEREST

This invention was made with government support under Contract Number: N00024-15-C-4022 0002 awarded by the Naval Sea Systems Command (NAVSEA). The government has certain rights in the invention.

TECHNICAL FIELD

The present disclosure relates to an underwater propeller, more particularly, to an underwater propeller design optimized to provide greater thrust at lower drive shaft speeds.

BACKGROUND

Propellers of various shapes and sizes are generally used to convert mechanical drive power from a motor or engine into thrust to propel a vessel through a fluid, such as water, air, etc. Propeller design can vary greatly depending on the operating parameters for the vessel for which the propeller is designed. Standard commercial off the shelf (COTS) propellers are available in various sizes and configurations; however, existing COTS propellers are usually designed as a "one-size fits all" to address multiple applications. In certain aspects, a specific propeller may be needed to address the needs of a specific vessel. For example, an unmanned underwater vehicle (UUV) designed to launch from an aircraft's ejection tube is subject to specific size limitations. Further, the intended speed envelope, motor properties, and fluid conditions affect the UUV's propeller's design as well. Therefore, a need exists for a more efficient, lower drive shaft speed, and non-cavitating propeller for a sonobuoy sized UUV. More specifically, a need exists for a propeller to achieve stealthy underwater applications.

SUMMARY OF THE INVENTION

According to a first aspect, a marine propeller comprises: a propeller hub; and two propeller blades, each propeller blade having a blade length with a proximal end attached to said propeller hub and a distal end extending radially outward from said propeller hub, wherein each of said propeller blades has a chord length that varies in size as a function of a radial position ratio, with a maximum chord length ratio between 0.300 and 0.330, wherein each of said propeller blades has a twist angle that decreases from the proximal end to the distal end as a function of the radial position ratio, wherein the twist angle is between 58 and 68 degrees at the proximal end and between 10 and 20 degrees at the distal end.

According to a second aspect, a marine propeller comprises: a propeller hub; and two propeller blades, each propeller blade having a blade length with a proximal end attached to said propeller hub and a distal end extending radially outward from said propeller hub, wherein each of said propeller blades has a constant hydrofoil shape along the blade length, wherein each of said propeller blades has a chord length that varies in size as a function of its radial position along said blade length, with a maximum chord length ratio between 0.307 and 0.322, wherein each of said propeller blades has a twist angle that decreases from the proximal end to the distal end as a function of the radial position along said blade length, wherein the twist angle is between 60.5 and 65.5 degrees at the proximal end and between 12.5 and 17.5 degrees at the distal end.

According to a second aspect, a marine propeller comprises: a propeller hub; and two propeller blades, each propeller blade having a blade length with a proximal end attached to said propeller hub and a distal end extending radially outward from said propeller hub, wherein each of said propeller blades has a constant hydrofoil shape along the blade length, wherein each of said propeller blades has a cord length that varies in size as a function of its radial position along said blade length, with a maximum cord length ratio between 0.307 and 0.322, wherein each of said propeller blades has a twist angle that decreases from the proximal end to the distal end as a function of the radial position along said blade length, wherein the twist angle is between 60.5 and 65.5 degrees at the proximal end and between 12.5 and 17.5 degrees at the distal end.

In certain aspects, each of said propeller blades has a constant hydrofoil shape along the blade length.

In certain aspects, said constant hydrofoil shape has a thicker low pressure surface towards its trailing edge.

In certain aspects, the marine propeller is a two-bladed propeller consisting of only two propeller blades.

In certain aspects, the maximum chord length ratio is between 0.307 and 0.322.

In certain aspects, the maximum chord length ratio is about 0.315.

In certain aspects, the twist angle is between 60.5 and 65.5 degrees at the proximal end.

In certain aspects, the twist angle is about 63 degrees at the proximal end.

In certain aspects, the twist angle is between 12.5 and 17.5 degrees at the distal end.

In certain aspects, the twist angle is about 15 degrees at the distal end.

In certain aspects, each propeller blade comprises a chord line connecting its leading edge to its trailing edge, wherein the twist angle is rotated relative to the propeller hub about a midpoint of the line.

In certain aspects, each propeller blade comprises a leading edge and the twist angle is rotated relative to the propeller hub about the leading edge.

In certain aspects, the propeller hub is permanently affixed to a drive shaft.

In certain aspects, the propeller hub and the two propeller blades are fabricated as a composite structure.

In certain aspects, the propeller hub and the two propeller blades are fabricated using aluminum or an aluminum alloy.

In certain aspects, the aluminum alloy is 6061 aluminum.

In certain aspects, the distal ends of the two propeller blades face opposite directions and a distance between the distal ends is between 2 and 5 inches.

In certain aspects, the distance between the distal ends is between 3 and 4 inches.

In certain aspects, each of said propeller blades has a chord length ratio between 0.252 and 0.280 when the radial position ratio is 0.50.

In certain aspects, each of said propeller blades has a cord chord length ratio between 0.312 and 0.316 when the radial position ratio is 0.25.

In certain aspects, each of said propeller blades has a cord chord length ratio between 0.147 and 0.176 when the radial position ratio is 0.75.

In certain aspects, each of said propeller blades has a twist angle between 26.236 degrees and 30.520 degrees when the radial position ratio is 0.50.

In certain aspects, each of said propeller blades has a twist angle between 40.338 degrees and 49.862 degrees when the radial position ratio is 0.25.

In certain aspects, each of said propeller blades has a twist angle between 18.497 degrees and 19.952 degrees when the radial position ratio is 0.75.

In certain aspects, the twist angle is defined by $y_1=72.519x^2-132.62x+76.714$, where $y_1$ is the twist angle and x is the radial position ratio.

In certain aspects, the chord length ratio is defined by $y_2=-0.3864x2+0.1015x+0.3116$, where $y_2$ is the chord length ratio and x is the radial position ratio.

In certain aspects, the twist angle and/or the chord length ratio of the propeller blades (or portion thereof) is in accordance with the data of FIG. 11a.

In certain aspects, the marine propeller is a two-bladed propeller consisting of only two propeller blades and having a diameter between 2 and 5 inches.

DESCRIPTION OF THE DRAWINGS

These and other advantages of the present disclosure will be readily understood with the reference to the following specifications and attached drawings wherein:

FIGS. 3a through 3c illustrate graphs of the testing data resulting from the testing performed with the testing apparatus of FIG. 2.

FIG. 4b illustrates a magnified rear perspective view of the UUV of FIG. 4a.

FIGS. 5a through 5c illustrate graphs of CFR data compared to data generated during testing of the third, fifth, and seventh propellers.

FIGS. 7a and 7b illustrate graphs of the torque and drive shaft speed vis-à-vis UUV speed.

FIG. 10 illustrates a plotted representation of the hydrofoil shape of the blade cross section.

FIG. 11a illustrates a table of the twist angle and chord length relative to the radial position of the blade in accordance with one embodiment.

DETAILED DESCRIPTION

Figure 1:
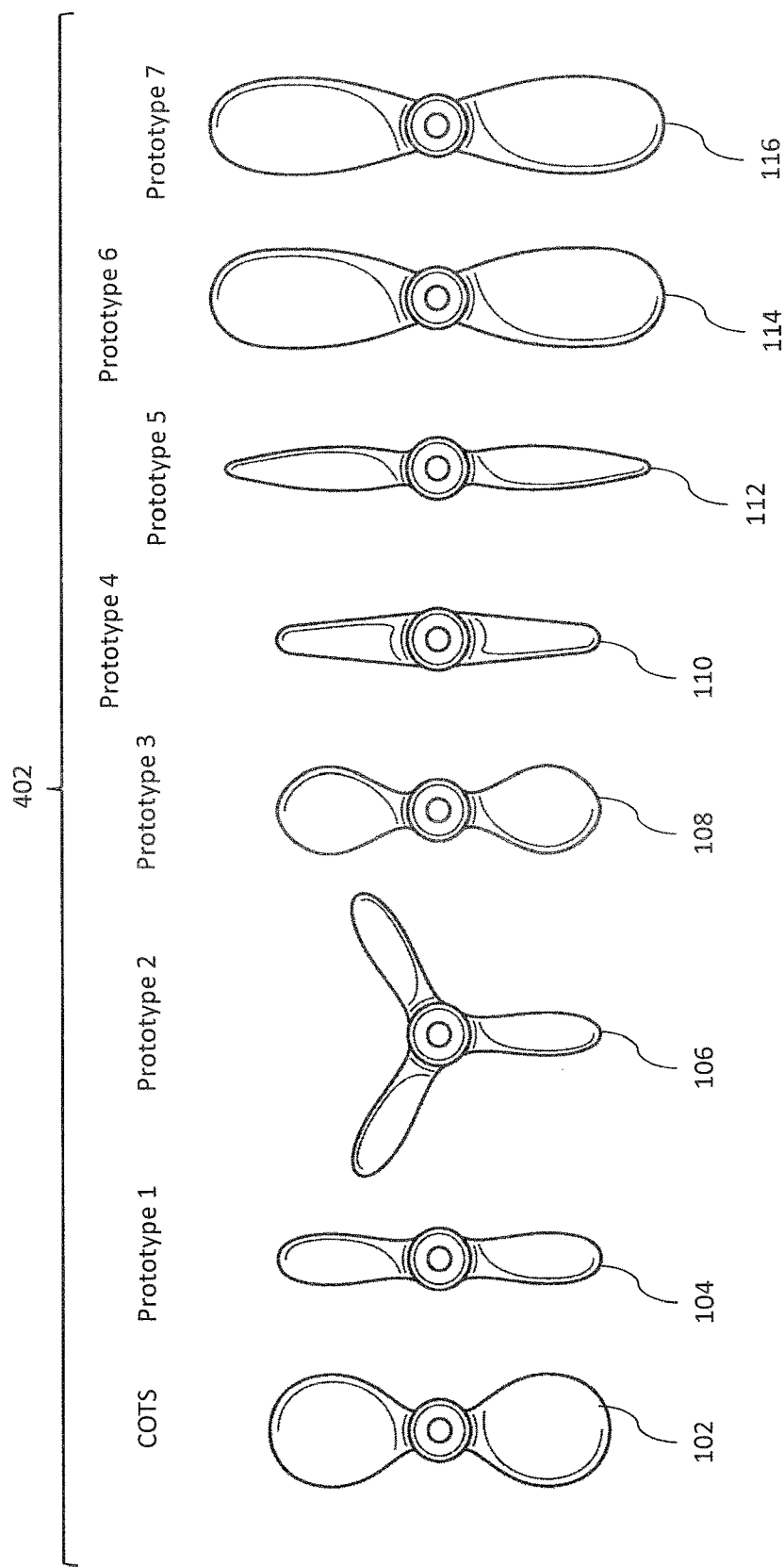
FIG. 1 illustrates a plurality of propellers for use with a UUV.

Preferred embodiments of the present disclosure will be described herein below with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments. In the following description, it is understood that terms such as "first," "second," "top," "bottom," "side," "front," "back," and the like, are words of convenience and are not to be construed as limiting terms. For this application, the following terms and definitions shall apply:

The terms "about" and "approximately," when used to modify or describe a value (or range of values), mean reasonably close to that value or range of values. Thus, the embodiments described herein are not limited to only the recited values and ranges of values, but rather should include reasonably workable deviations. The terms horizontal and vertical, as used herein, are used to describe angles or planes relative to the surface of the water.

The terms "aerial vehicle" and "aircraft" refer to a machine capable of flight, including, but not limited to, traditional aircraft and vertical takeoff and landing (VTOL) aircraft. VTOL aircraft may include both fixed-wing aircraft, rotorcraft (e.g., helicopters), and/or tilt-rotor/tilt-wing aircraft.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para-aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may employ a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix.

The term "composite structure" as used herein, refers to structures or components fabricated, at least in part, using a composite material, including, without limitation, composite laminates.

The term "fluid," when used as a noun, refers to a free-flowing deformable substance with no fixed shape, including, inter alia, gas (e.g., air, atmosphere, etc.), liquid (e.g., water), and plasma.

The term "propeller" refers to a mechanical device used to convert the rotational mechanical drive power into thrust to propel a vessel through a fluid.

The terms "underwater vehicle" and "vessel" refer to a machine capable of movement through the water, including, but not limited to, unmanned underwater vehicles (UUV), torpedoes, cylindrical manned underwater vehicles that can operate below or on the surface of the water (e.g., submarines), and/or the new category of watercraft similarly shaped, as disclosed herein.

Disclosed herein is a propeller for a compact UUV (e.g., a sonobuoy sized UUV) designed to launch from a vehicle's ejection tubes. An ejection tube (e.g., a class A sonobuoy tube) may be integrated with a vehicle, such as an aircraft, ship, submarine, etc., and used to drop and/or eject a cylindrical object, such as a canister, sonobuoy, or, as is the case here, a compact UUV. For example, many aircraft, such as the Lockheed P-3 Orion, may be configured with one or more sonobuoy tubes to eject a relatively small buoy (often 5 inches in diameter and about 3 feet long) called a sonobuoy. The sonobuoy floats along the surface of the water and relays acoustic information (e.g., from its hydrophone(s)) to operators aboard the aircraft via UHF/VHF radio. In lieu of sonobuoys, the ejection tube(s) may instead be configured to eject a comparably sized UUV.

The compact UUV's redesigned propeller may be designed for maximum vehicle speed with minimal motor power and drive shaft speed. Optimizing a propeller offers multiple benefits to the compact UUV. A more efficient propeller allows for the greater maximum speeds. Moreover, at a given speed, a more efficient propeller requires less energy to maintain the speed, which can be measured as the shaft torque being produced by the UUV's internal motor or engine. As a result of the increased efficiency, the UUV benefits from greater operational range as a function of the onboard battery's energy capacity compared a COTS propeller.

A lower operating speed extends the useful life of the UUV's shaft seal, which provides the barrier between the water outside a vessel and the water sensitive components within the vessel. The shaft seal wears as a function of the drive shaft speed and the total number of revolutions. That is, operation at higher drive shaft speeds accelerates the wear of the shaft seal as compared to lower drive shaft speeds. As such, a propeller with a lower operating speed reduces the amount of wear on the shaft seal on a given mission and increases the operational hours and number of missions between shaft seal replacement. For further information on shaft seals, an example shaft seal is described in greater detail by commonly owned U.S. patent application Ser. No. 15/403,963 to Daniel W. Dichter et al., which was filed on Jan. 11, 2017 and is titled "Passive Fault-Tolerant Shaft Seal Configuration."

A redesigned propeller can also help avoid cavitation at the propeller blades, which can occur when the pressure on the suction side of the propeller blade drops substantially; causing the water behind the propeller blade to flash from a liquid into a gas. Cavitation depends greatly on the tangential speed of the propeller blade, as the shape of the propeller blade, and the angle of the blade. Cavitation introduces multiple adverse effects for the UUV. First, a propeller's efficiency decreases as the propeller transitions from a non-cavitating condition to a cavitating condition. Secondly, the vapor bubbles created by cavitation collapse to create shock waves directly onto the propeller blades. These shock waves can damage the propeller's surface, resulting in wear and pitting of the propeller blades. This propeller blade damage results in lower efficiency of the propeller even after cavitation ends, and, as a result, either the propeller requires replacement or the UUV will have performance impacts, such as speed or endurance limitations. Finally, the formation and collapse of the vapor bubbles results in noise radiation by the propeller, which is significantly higher than a non-cavitating propeller. This cavitational noise can result in a greater detection range by passive sonars that rely on sensing noise emissions of a given target. For a UUV operating covertly, this additional noise would potentially result in detection, a failed mission, and/or capture.

FIG. 1 illustrates a COTS propeller 102 currently used in the UUV vis-à-vis seven prototype propellers 104, 106, 108, 110, 112, 114, 116, which were developed to evaluate and identify an efficient propeller design to be used in a compact UUV configured to be launched from an ejection tube. The COTS propeller 102 is a cast metal two-bladed propeller with a 0.0051 meter hub diameter and 0.0744 meter tip diameter. While the COTS propeller 102 is functional, it is not designed for low-RPM operation; leading to inefficiencies at higher vehicle speeds and consequently high wear on the shaft seal. As a replacement to the COTS propeller 102, seven prototype propellers were designed and developed in accordance with different optimization methodologies. The seven prototype propellers 104, 106, 108, 110, 112, 114, 116 were designed in accordance with a variety of optimization criteria, operating conditions, constraints, and combinations thereof. The seven prototype propellers 104, 106, 108, 110, 112, 114, 116 were subsequently tested to evaluate each propeller's performance using water tunnel testing. Specifically, each propeller was initially evaluated based on two criteria: efficiency and operating speed at 12 knots (to minimize shaft speed).

The first prototype propeller 104 is a two-bladed propeller designed for both maximum efficiency at 12 knots and diameter size (with a diameter of 0.07 meter). The second prototype propeller 106 is a three-bladed propeller maximized for efficiency at 12 knots with a diameter of 66 mm (millimeters). The third prototype propeller 108 is a two-bladed propeller designed for maximum efficiency at 8 knots and with a diameter of 69 mm. The fourth prototype propeller 110 is a two-bladed propeller designed for maximum efficiency at 12 knots with a diameter of 62 mm. The fifth prototype propeller 112 is a two-bladed propeller designed for maximum efficiency at 12 knots while increasing the baseline force targets by 20% and has a diameter of 92 mm. The sixth prototype propeller 114 is a two-bladed propeller designed for maximum efficiency at 12 knots and has a diameter of 97.7 mm. The seventh prototype propeller 116 is a two-bladed propeller designed for maximum efficiency at 12 knots while increasing the baseline force targets by 20% and with a diameter of 98 mm.

Figure 2:
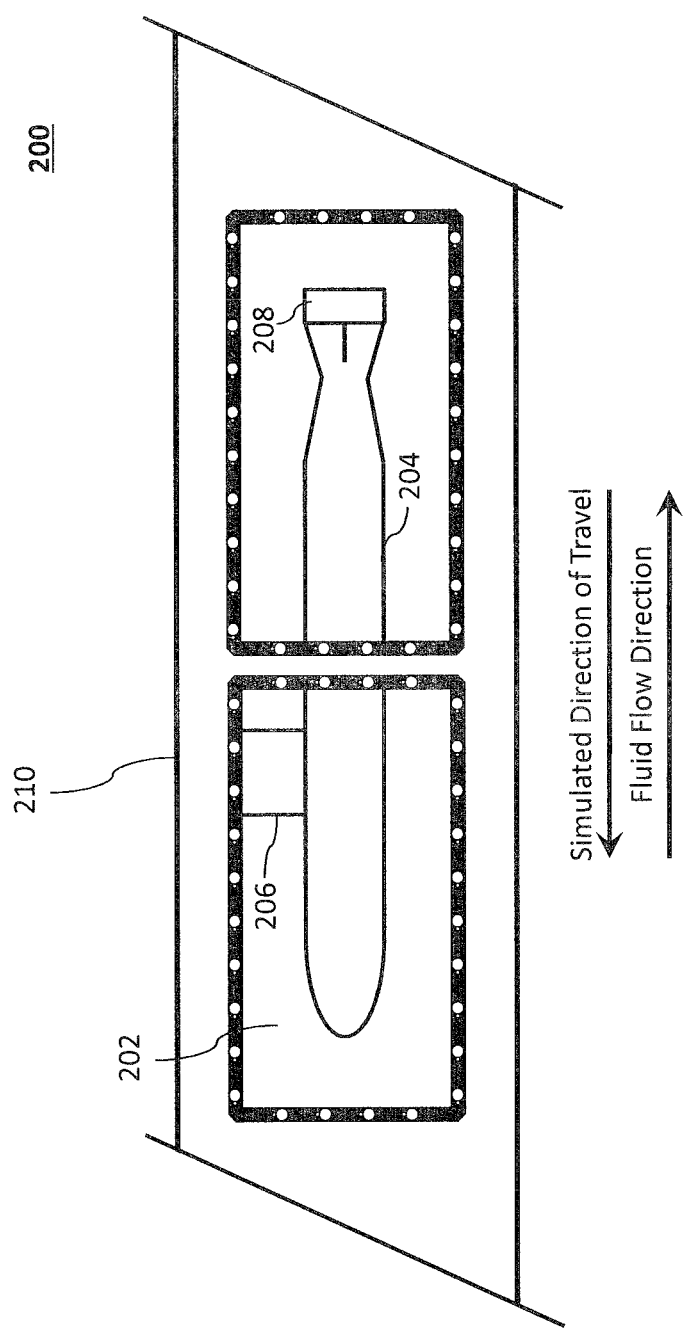
FIG. 2 illustrates a diagram of the testing apparatus used to test the propellers of FIG. 1.

FIG. 2 illustrates the testing arrangement 200 used to evaluate the COTS propeller 102 vis-à-vis the seven prototype propellers 104, 106, 108, 110, 112, 114, 116. As illustrated, the testing arrangement 200 generally comprises a housing 210 to define a fluid testing chamber 202, which may be sized and shaped to house a UUV 204. For example, the fluid testing chamber 202 used during testing employed a square cross section of 12 inches by 12 inches. During the evaluation, the UUV 204 was fixedly mounted within the fluid testing chamber 202 and secured in place via a strut 206. The strut 206 may be equipped with a force gauge to monitor the force needed to maintain the UUV 204 stationary during testing. In operation, the fluid in the testing chamber 202 traveled against the nose (forward) end of the UUV to simulate movement of the UUV 204. Specifically, with reference to FIG. 2, the fluid traveled from left to right as indicated by the fluid flow direction arrow to simulate a UUV 204 traveling from right to left, as indicated by the simulated direction of travel arrow.

The UUV 204 employed during the testing was the same diameter as the UUV for which the propellers were designed (i.e., a UUV to be expelled from a sonobuoy tube), but the length was slightly longer accommodate ballast to balance the weight and keep testing version of the UUV 204 level inside the fluid testing chamber 202. Specifically, the compact UUV 204 used during testing was 6 inches in diameter with a length of 45 in. A full-size compact UUV 204, however, may be 2 to 10 inches in diameter, more preferably about 5 to 7 inches in diameter, most preferably about 6 inches in diameter, with a length of about 1 to 5 feet, more preferably about 3 feet. Each of the COTS propeller 102 and the seven prototype propellers 104, 106, 108, 110, 112, 114, 116 were separately tested through installation onto the drive shaft (propeller shaft) of the UUV 204 inside the shroud 208. Fluid (water) was passed through the fluid testing chamber 202 in the fluid flow direction at various speeds (e.g., ranging from 3 to 12 kts) and propeller RPMs (e.g., ranging from 0 to 6000 RPM). The UUV 204 propellers were tested by maintaining a constant fluid speed and gradually increasing the drive shaft speed. The force gauge measurements from the strut 206 were then plotted against the UUV's 204 drive shaft RPM.

Figure 3A:
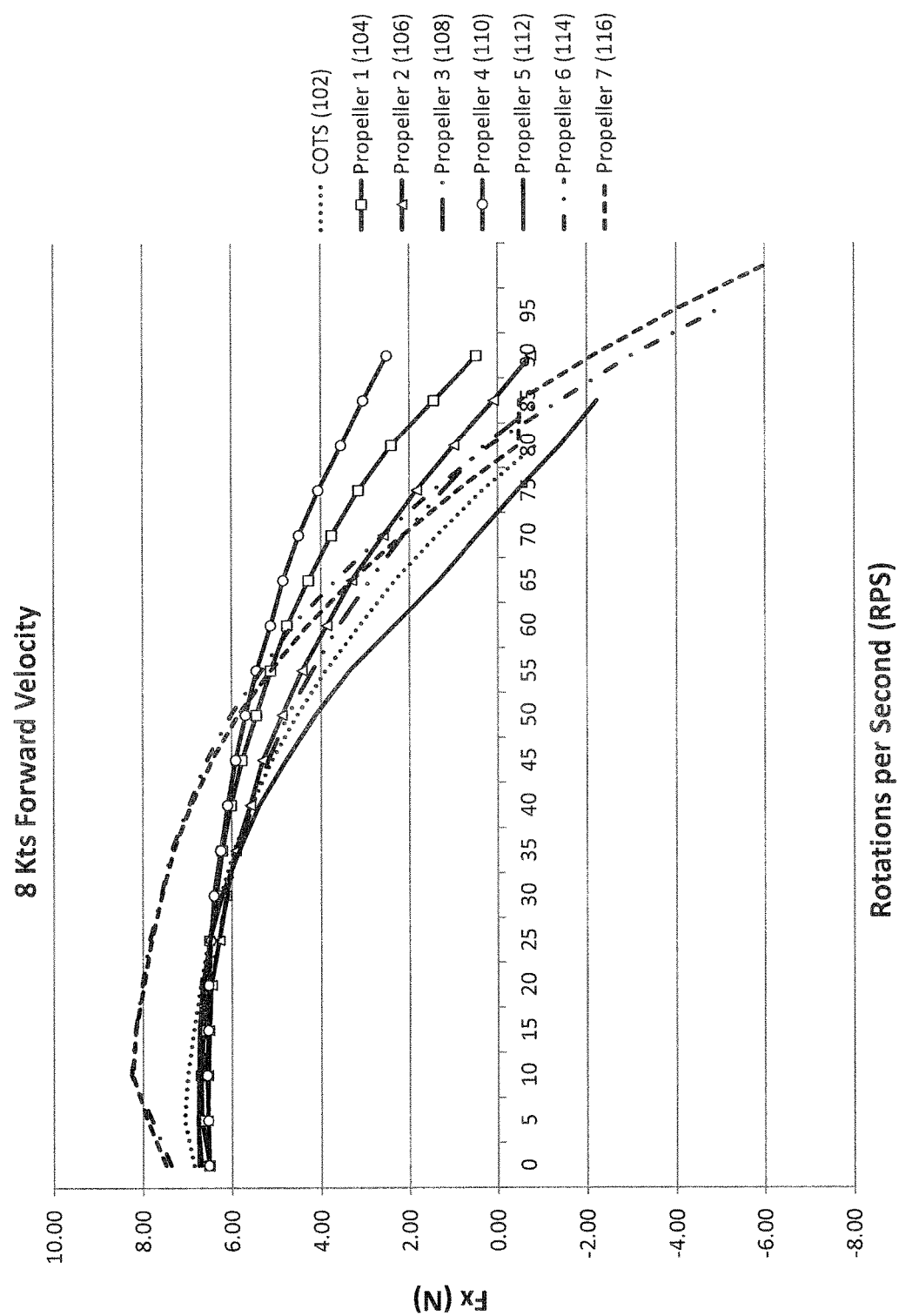

FIG. 3a provides an example of the testing data at 8 kts of fluid speed plotted for each of the COTS propeller 102 and the seven prototype propellers 104, 106, 108, 110, 112, 114, 116. The drive shaft speed where a propeller curve crosses the x-axis provides the theoretical drive shaft speed that the UUV 204 would require to travel through the water for at given velocity (illustrated as 8 kts). FIG. 3b provides an enlargement of FIG. 3a, which has been zoomed to the area where the various propeller curves cross the x-axis. For example, the fifth prototype propeller 112 would require about 73.5 rotations per second (RPS) (i.e., 4409 rotations per minute (RPM)) to travel at 8 kts through the water, which is less than the other tested propellers.

The data provided in FIGS. 3a and 3b may be used for qualitative analysis rather than quantitative analysis due to the modified flow characteristics resulting from the size of the fluid testing chamber 202 relative to the size of the UUV 204. That is, the UUV's 204 body occupied a substantial portion of the fluid chamber's 202 cross-section, which can cause a modified flow field, including decreased pressure over the aft end, which would not be seen in an in-water configuration. Moreover, the strut 206 securing the UUV 204 can affect the flow of the fluid. In addition, the difference in length of the UUV 204 for testing compared to the actual UUV 204 can also affect the flow characteristics. Nevertheless, the testing data clearly demonstrates the advantages of the fifth prototype propeller 112 over the other propellers. FIG. 3c provides the zero force drive shaft speeds for each of the propellers at the different fluid speeds tested. As illustrated, the fifth prototype propeller 112, again, is able to achieve the same tunnel speed (in knots, kts), but at lower RPMs. Based on the testing data, the three prototype propellers that best minimized the drive shaft speed were the third prototype propeller 108, the fifth prototype propeller 112, and the seventh prototype propeller 116; where the fifth prototype propeller 112 exhibited the greatest performance at all tested speeds.

Figure 4A:
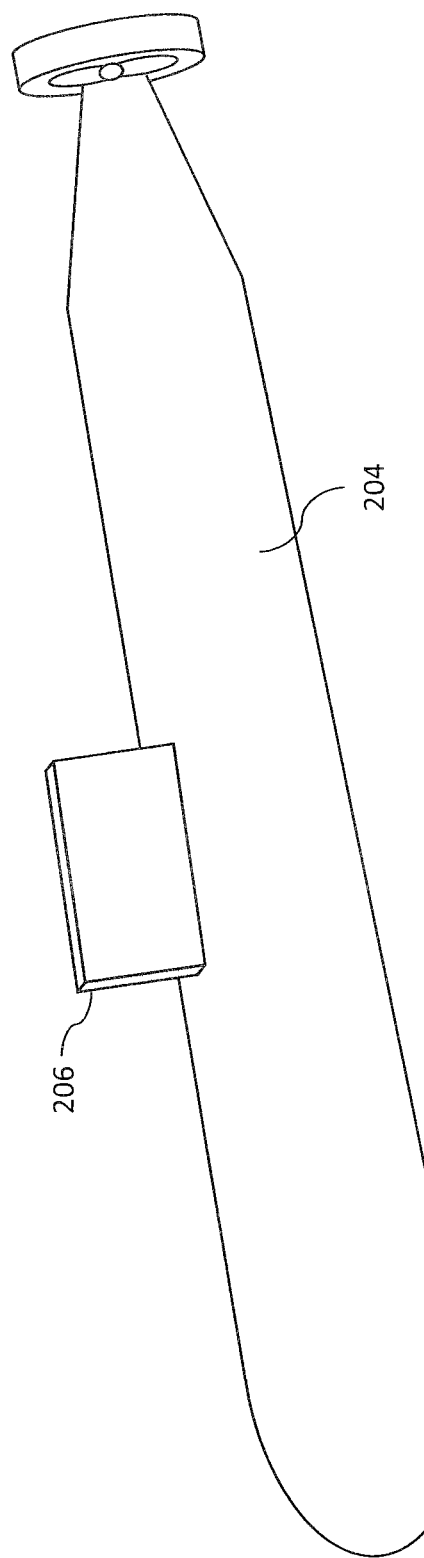
FIG. 4a illustrates a computational fluid dynamic (CFD) model of a UUV.
Figure 4B:
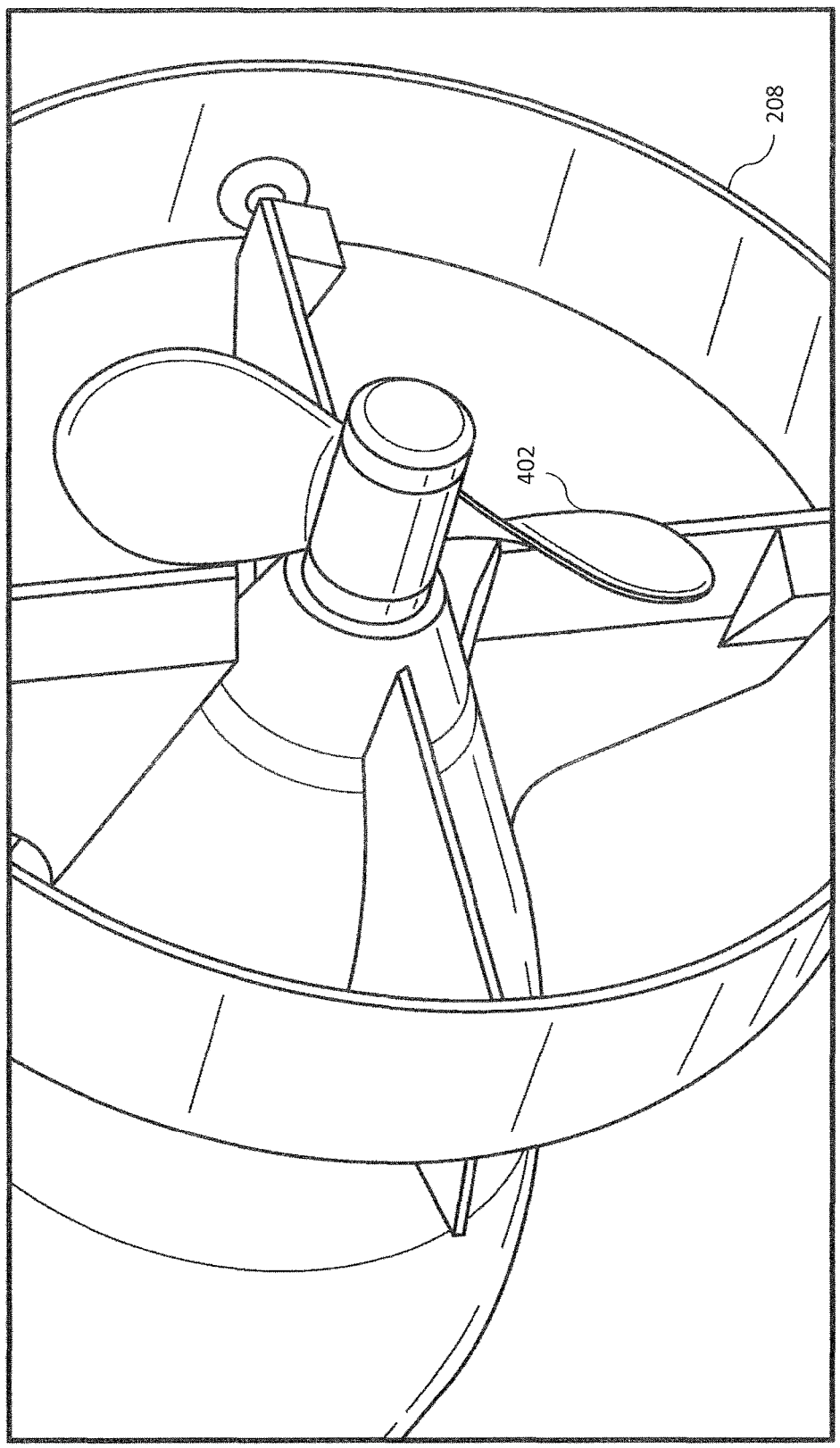
Figure 6:
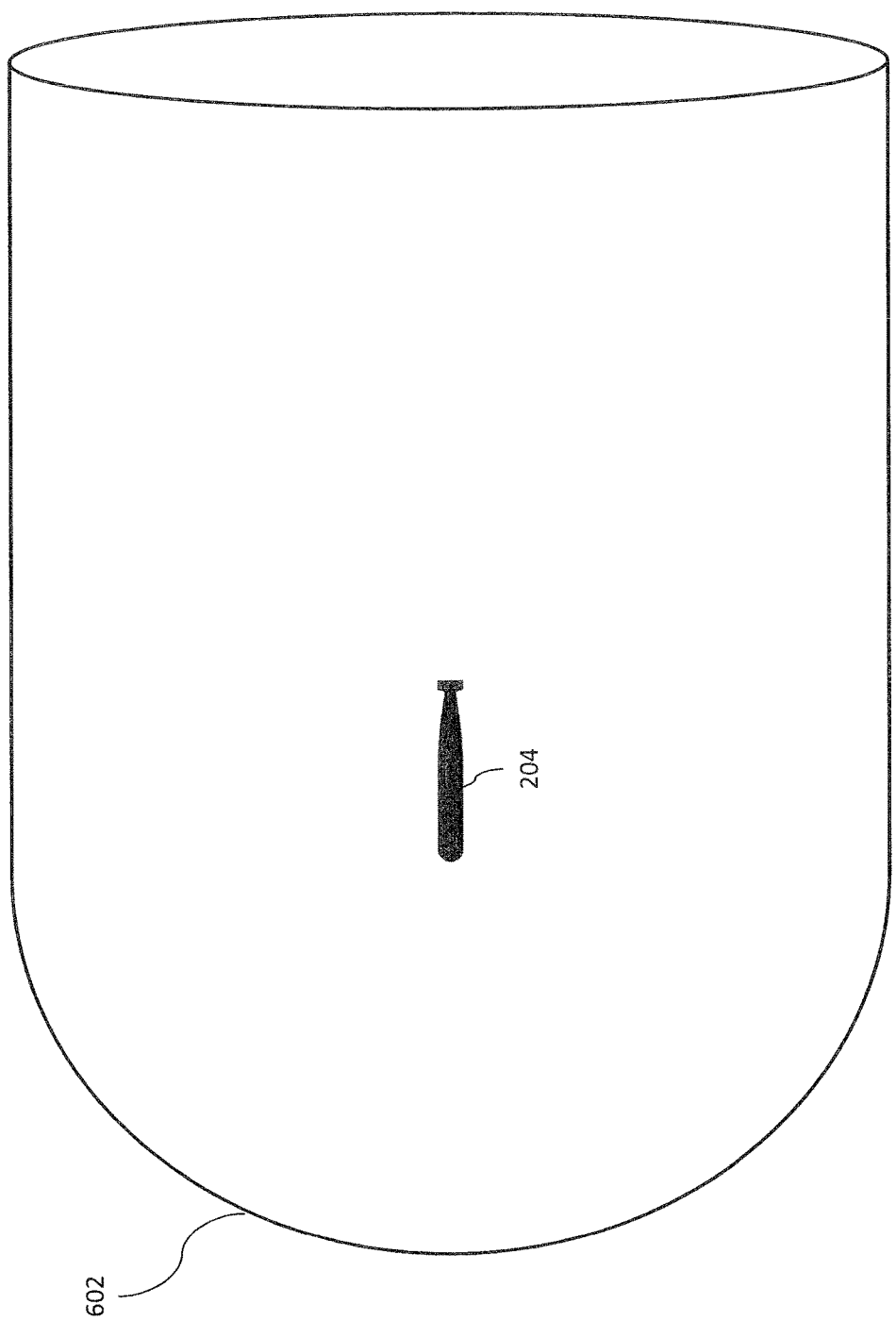
FIG. 6 illustrates an expanded CFD model of the UUV simulating an open water condition.

As illustrated in FIG. 4a, a CFD model was created to model the experimental testing performed within the fluid testing chamber 202. The UUV 204 was modeled with the elongated shape used for testing and the strut 206 was modeled as well. The propellers 402 (i.e., the COTS propeller 102 and the seven prototype propellers 104, 106, 108, 110, 112, 114, 116) were modeled inside of the shroud 208 as shown in FIG. 4b. The CFD model calculated the expected propeller speeds for each of the fluid speeds of the physical test from FIG. 3c and for each of the COTS propeller 102 and the seven prototype propellers 104, 106, 108, 110, 112, 114, 116. The results of the CFD model for the third prototype propeller 108, the fifth prototype propeller 112, and the seventh prototype propeller 116 are illustrated in FIGS. 5a through 5c, respectively. As can be appreciated, the CFD model validated the fluid chamber test results because the physical test data (indicated using lines) closely matched the CFD model data (indicated using point markers). The CFD model was subsequently expanded to simulate an open water condition 602, as shown in FIG. 6. The standard production length of the UUV 204 was used instead of the longer version used for the fluid chamber. Also, the CFD open water model removed the strut 206. Due to the larger number of nodes within the open water CFD model, the calculation was only run for the three prototype propellers that best minimized the drive shaft speed in FIGS. 3a through 3c, namely the third prototype propeller 108, the fifth prototype propeller 112, and the seventh prototype propeller 116.

Figure 7B:
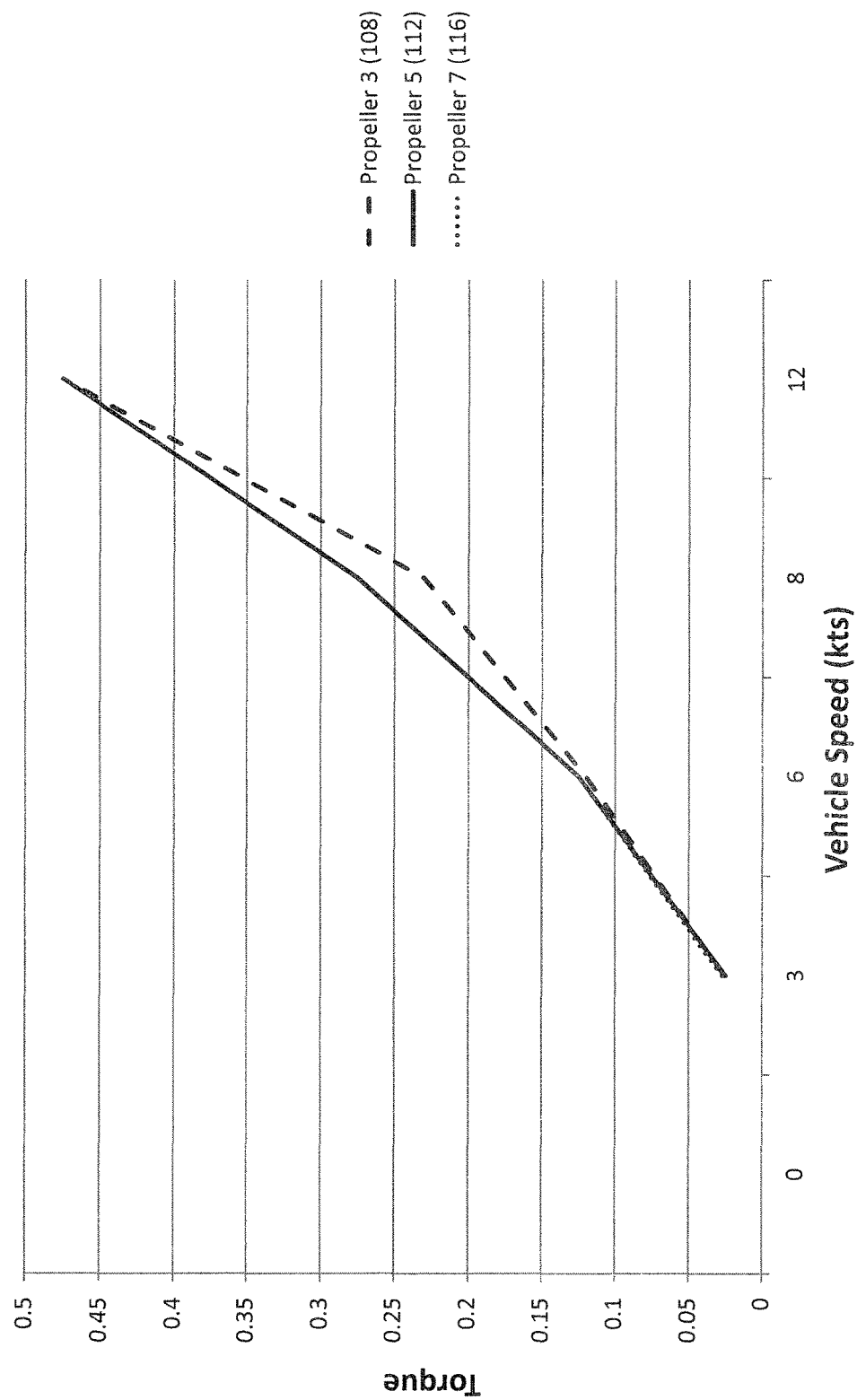

Both the drive shaft speed and torque were recorded for the various water speeds of the open water CFD model. The results are plotted in FIGS. 7a and 7b. The fifth prototype propeller 112 demonstrated the lowest drive shaft speed at every vehicle speed tested, as shown in FIG. 7a. The difference in torque was negligible for each of the propellers at the various calculated speeds, as shown in FIG. 7b. The fifth prototype propeller 112, however, produces the highest torque at a low RPM, which is beneficial to in-water applications. Ultimately, the fifth prototype propeller 112, compared to the other propellers analyzed, required significantly less power to produce the same amount of thrust. In view of the test data, the fifth prototype propeller 112 is the most efficient and, therefore, the most suitable replacement for a COTS propeller 102.

Figure 8A:
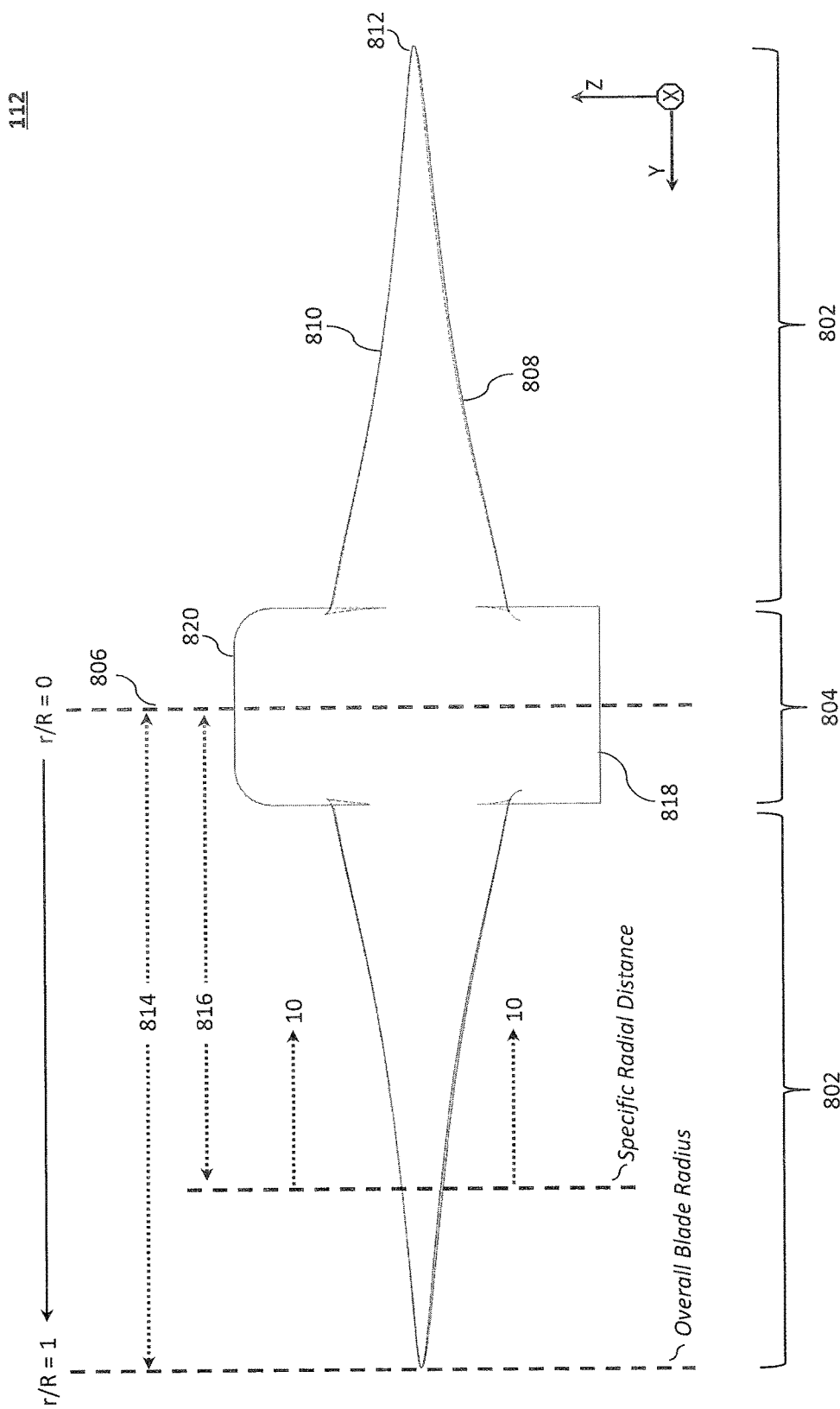
FIGS. 8a through 8f illustrate multiple views of the most efficient prototype propeller selected from the propellers of FIG. 1.

Detailed views of the fifth prototype propeller 112 are shown in FIGS. 8a through 8f. FIG. 8a illustrate an annotate side view of the fifth prototype propeller 112, while FIGS. 8b through 8f illustrate, respectively, an isometric view, a top plan view, a first side view, a second side view, and a cross sectional second side view. The fifth prototype propeller 112 is particularly well-suited for UUVs 204 that in the that could fit in a class-A Sonobouy tube, or smaller.

The various propellers, including the fifth prototype propeller 112, may be fabricated from one or more materials suitable for the fluid in which the vessel is operating (e.g., fresh water, sea water, etc.). Suitable materials include, inter alia, aluminum, brass, bronze, stainless steel, alloys thereof, plastic, plastic composites, composite materials, or any other suitable material. For example, 6061-T6 aluminum may be employed, which is a precipitation-hardened aluminum alloy, containing magnesium and silicon as its major alloying elements. T6 temper 6061 aluminum has an ultimate tensile strength of at least 290 MPa (42,000 psi) and yield strength of at least 240 MPa (35,000 psi). For the purpose of this disclosure, the propellers can be manufactured by machining, casting, welding, additive printing, and/or any other suitable method for making or combining the applicable parts of the propeller.

With reference to FIG. 8a, the fifth prototype propeller 112 generally comprises two propeller blades 802 coupled to the propeller hub 804. Each propeller blade 802 has a blade length with a proximal end attached to the propeller hub 804 and a distal end extending radially outward from said propeller hub. As illustrated, the distal ends of the two propeller blades 802 face opposite directions (i.e., positioned at 180 degrees apart). The propeller hub 804, together with the two propeller blades 802, is configured to rotate about a center axis 806. To that end, the propeller hub 804 may comprise a bore 826 to receive the drive shaft from the motor or engine. The bore 826 may be about 0.25 to 0.50 inches, more preferably about 0.387 inches, in diameter at the front hub surface 818, while the bore 826 may narrow to about 0.10 to 0.30 inches, more preferably about 0.197 inches, in diameter at the back hub surface 820. The drive shaft, the diameter of which may be size slighter larger than the bore 826 at the back hub surface 820, may be secured within the bore 826 using one or more set screws and a set screw shaft 828. The set screw shaft 828 may be a diameter of 0.05 to 0.15 inches, more preferably about 0.1 inches. The bore 826 may further include splines to engage corresponding splines of the drive shaft, thereby mitigation slippage of the drive shaft relative to the propeller hub 804.

Figure 8B:
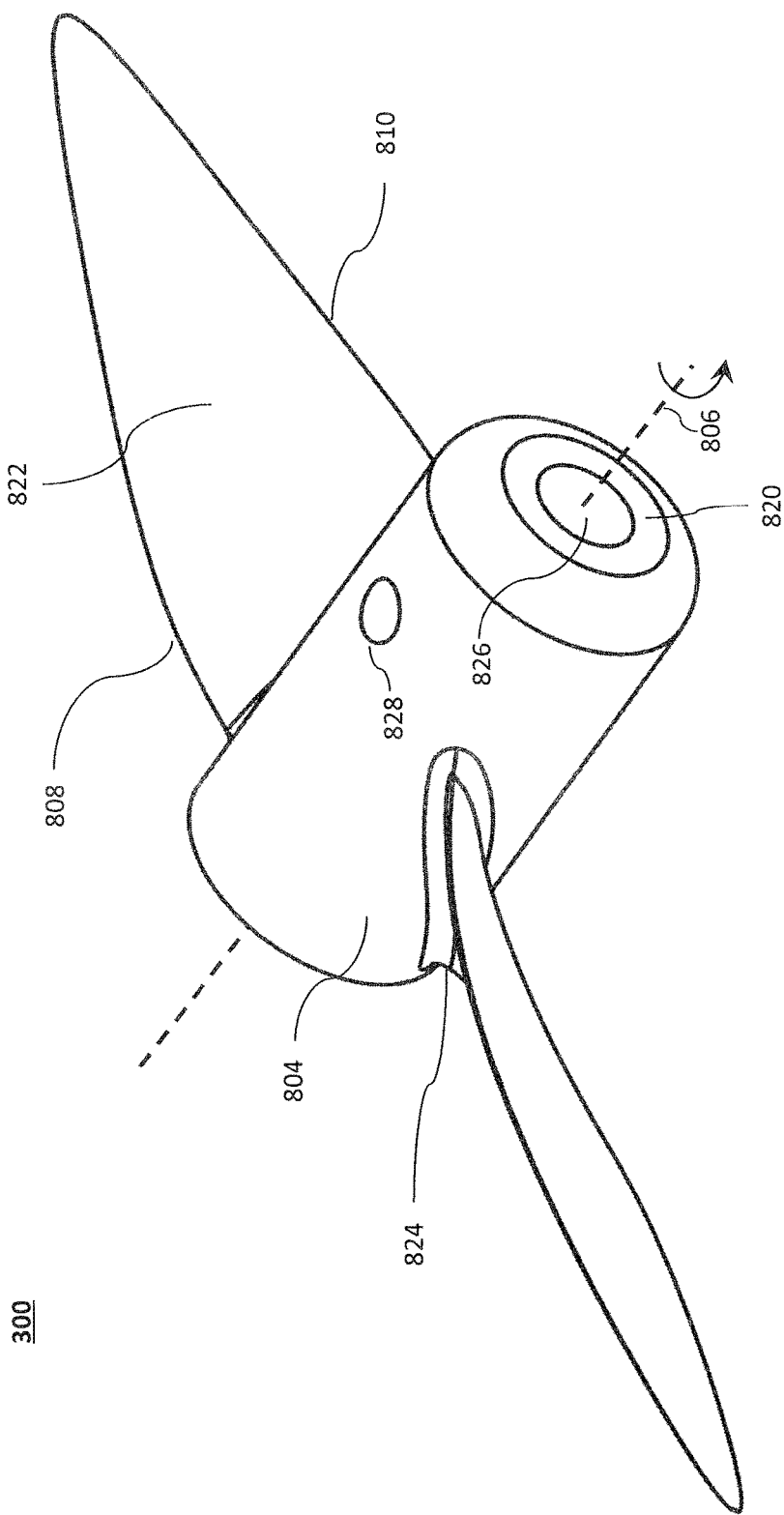
Figure 8C:
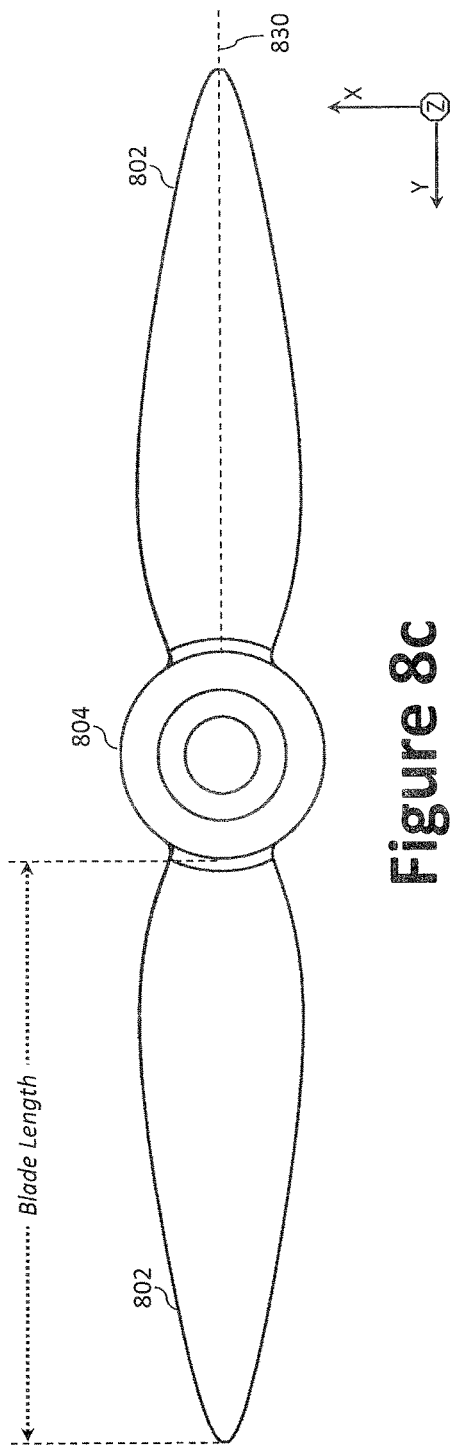
Figure 8D:
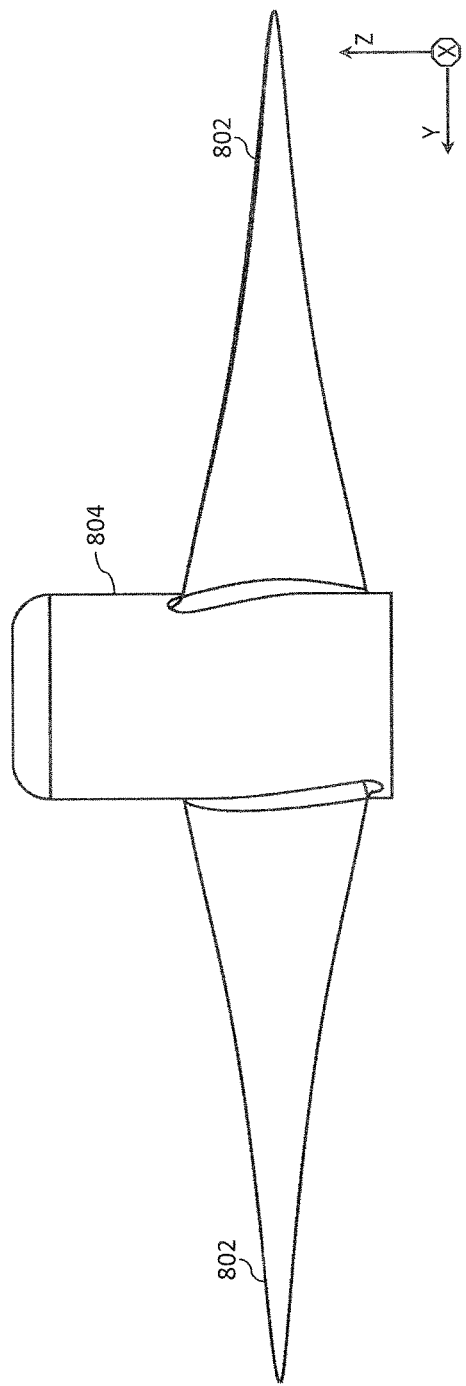
Figure 8F:
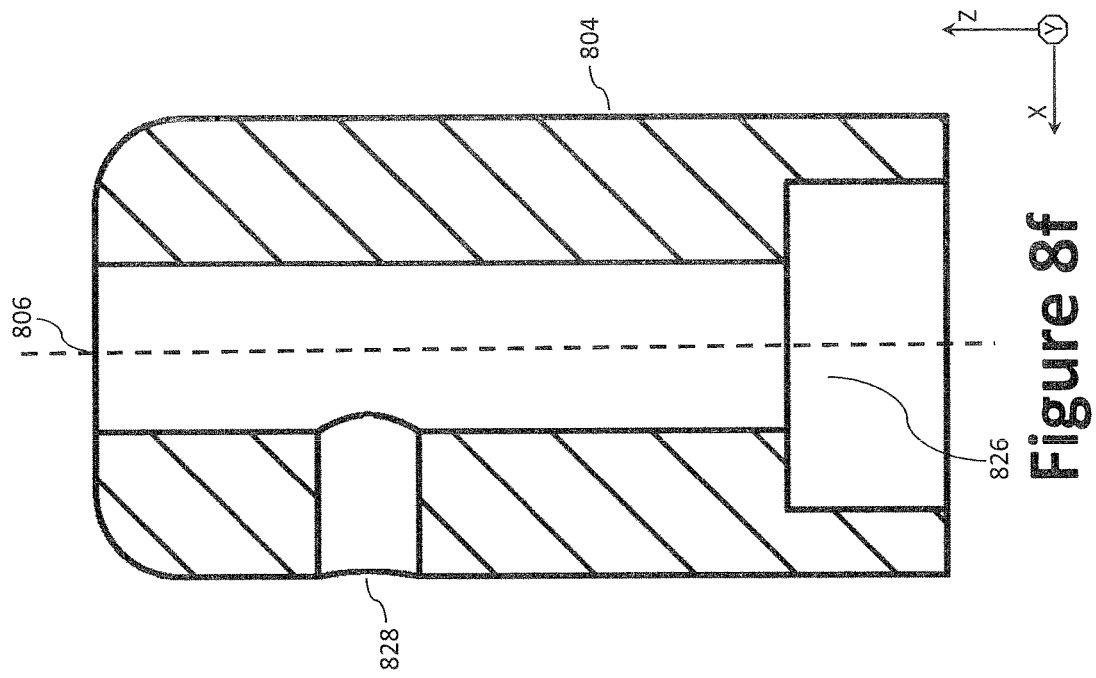
Figure 8E:
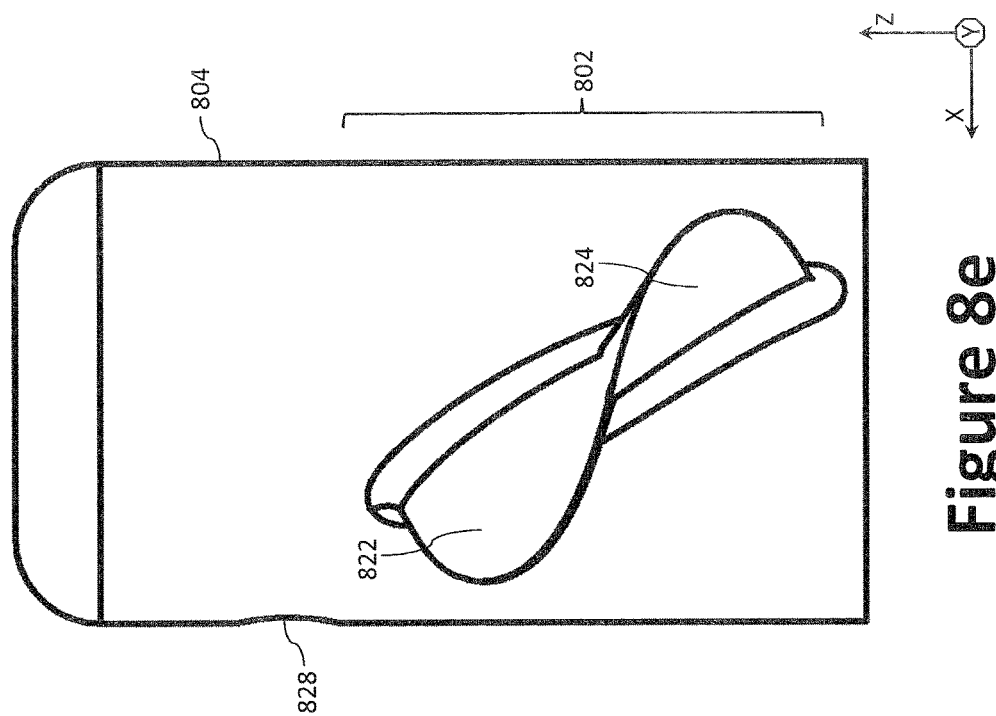

As best illustrated in FIG. 8b, the center axis 806 is positioned at the radial center of the propeller hub 804. The propeller hub 804 may be 0.5 to 2 inches in height, more preferably about 1 inch in height, with a diameter of about 0.25 to 1 inches, more preferably, about 0.5 inches. Each propeller blade 802 includes a leading edge 808 and trailing edge 810. The leading edge 808 of a propeller blade 802 is the first part of the propeller blade 802 to make contact with the water (or other fluid) as the fifth prototype propeller 112 rotates. Conversely, the trailing edge 810 is the last part of the propeller blade 802 to make contact with the water as the fifth prototype propeller 112 rotates. The total diameter of the fifth prototype propeller 112 may be about 2 to 5 inches, more preferably, about 3 to 4 inches. In one embodiment, the propeller blade 802 may have a total diameter of about 92 mm (i.e., 3.620 inches), where the propeller hub's 804 diameter accounts for about 13.75 mm (i.e., 0.54 inches) of the overall diameter.

The blade tip 812 (distal end) is the furthest point radially on the propeller blade 802 from the center axis 806. The radial distance from the center axis 806 to the blade tip 812 refers to the overall blade radius (R) 814, while a specific blade radius (r) 816 refers to the distance from the center axis 806 to a radial position along the blade length of the propeller blade 802. As will be appreciated, the radial position is not fixed, but rather, operates as a reference point along the blade length of the propeller blade 802. Indeed, the twist angle and the chord length vary in size as a function of its radial position along said blade length. The front (proximal) hub surface 818 of the propeller hub 804 is the side that is abuts, or is closest, to the main body of the UUV 204, while the back (distal) hub surface 820 is the side of the propeller hub 804 faces away from the main body of the UUV 204. The cross section 10-10 through the propeller blade 802 facing towards the propeller hub 804 at the specific blade radius 816 is shown in FIG. 9.

As the fifth prototype propeller 112 rotates, the high pressure side 822 of the propeller blade 802 provides force to push the UUV 204 through the water. The low pressure side 824 of the propeller blade 802 creates a negative pressure in the water as the propeller rotates. As represented in FIG. 8b, the fifth prototype propeller 112 rotates in a counter clockwise direction (as viewed from the back surface of the propeller hub 804). However, an equivalent propeller could be also be made to rotate in a clockwise direction by pivoting each of the propeller blades 802 by 180 degrees about its longitudinal axis 830 relative to the propeller hub 804.

Figure 9:
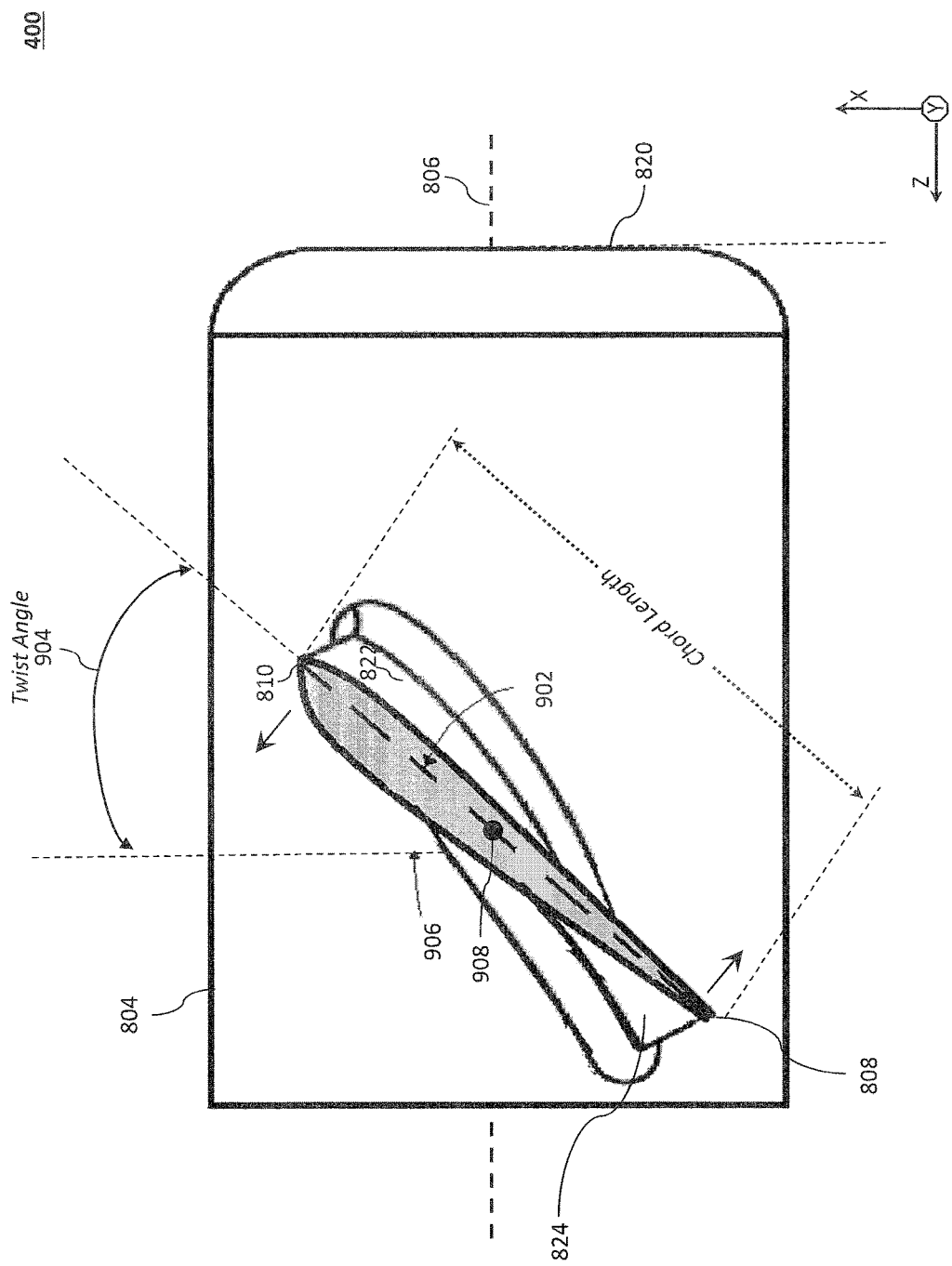
FIG. 9 illustrates a cross sectional view through a blade of the prototype propeller of FIGS. 8a through 8f looking toward the propeller hub.
Figure 11B:
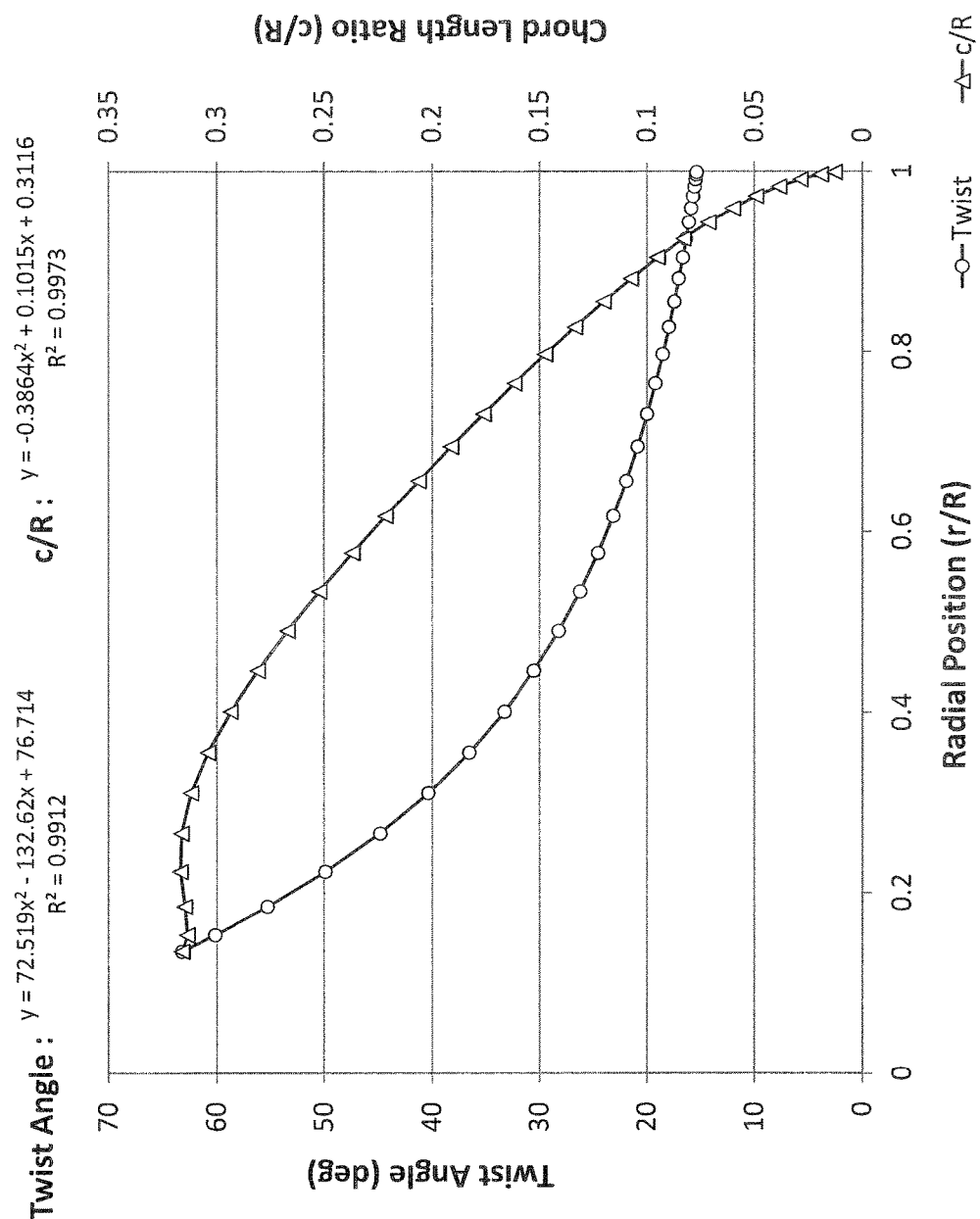
FIG. 11b illustrates a plot of the twist angle and chord length relative to the radial position of the blade in accordance with one embodiment.

FIG. 9 illustrates a cross section of the propeller blade 802 as viewed looking towards the propeller hub 804, as called out as 10-10 on FIG. 8a. The chord line 902 is a line connecting the leading edge 808 and the trailing edge 810 of the propeller blade 802. The length of the chord line 902 (i.e., chord length) changes as a function of the specific blade radius 816, as best shown in FIGS. 11a and 11b. That is, the chord length changes depending on its position along the blade length of the propeller blade 802. For example, the chord length of the cord chord line 902 is shortest near the blade tip 812.

The twist angle 904 is the angle between the chord line 902 and a reference line 906 that is perpendicular to the center axis 806 (i.e., perpendicular to the axis of rotation). The twist angle 904 decreases from the propeller hub 804 to the blade tip 812 as shown in FIGS. 11a and 11b (i.e., the twist angle 904 decreases as the distance from the propeller hub 804 increase—an inverse relationship). As drawn, the twist angle 904 rotates about the midpoint 908 of the chord line 902 as a function of the specific blade radius 816. As illustrated, the midpoint 908 is half-way (e.g., equidistance) between the leading edge 808 and the trailing edge 810. Instead of the midpoint 908, the twist angle 904 may be rotated at the leading edge 808, the trailing edge 810, or another point along the chord line 902 between the leading edge 808 and the trailing edge 810. As illustrated, the twist angle curve is generally described by the equation y=72.519x 2−132.62x+76.714, where the coefficient of determination (R2) is 0.9973, while the c/R curve is generally described by the equation y=−0.3864x2+0.1015x+0.3116, where the R2 is 0.9973.

FIG. 10 illustrates the shape of the hydrofoil of the propeller blade 802. The hydrofoil shape of the propeller blade 802 may remain constant for every specific blade radius 816, but is scaled as a function of the specific radius. As the length of the chord line 902 changes, the other dimensions creating the high pressure side 822 and low pressure side 824 change proportionally in order to maintain a constant hydrofoil shape. As illustrated, the low pressure side 824 exhibits a greater curvature than the high pressure side 822 of the propeller blade 802. The low pressure side 824 of the chord line 902 is thicker towards the trailing edge 810 in order to minimize the pressure drop across the surface of the low pressure side 824 and as a result prevent cavitation.

FIGS. 11a and 11b illustrate, respectively, the data points and a graph of the twist angle 904 ("Twist ∠") and the chord length ratio ("c/R") vis-á-vis the radial position ratio ("r/R"). The radial position radio is the ratio of the specific blade radius 816 to the overall blade radius 814, such that the radial position is 0.0 at center of the propeller hub 804 (i.e., the center axis 806) and is 1.0 at the blade tip 812. Specifically, the twist angle 904 starts at 63 degrees adjacent the propeller hub 804, and then decreases to 15 degrees at the blade tip 812. The chord length ratio refers to the ratio between the chord line 902 at a given radial position to the overall blade radius 814. Specifically, the chord length ratio is 0.316 adjacent the propeller hub 804 (i.e., where r/R=0.13541), expands to 0.317 at its largest point (i.e., where r/R=0.2233), then approaches 0 at the blade tip 812 (i.e., where r/R=0.99933, or about 1).

Therefore, each of said propeller blades has a chord length that varies in size as a function of its radial position along its blade length, with a maximum chord length ratio between 0.300 and 0.330, more preferably between 0.307 and 0.322, most preferably about 0.315. In addition, the propeller blades have a twist angle that decreases from the propeller hub (proximal end) to the blade tips (distal end) as a function of the radial position along the blade length. As illustrated, the twist angle at the proximal end may be between 58 and 68 degrees, more preferably between 60.5 and 65.5 degrees, most preferably about 63 degrees, while the twist angle at the distal end may be between 10 and 20 degrees, more preferably between 12.5 and 17.5 degrees, most preferably about 15 degrees.

While the present disclosure has been described with respect to what is presently considered the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation to encompass all such modifications and equivalent structures and functions.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A marine propeller comprising:
   a propeller hub; and
   two propeller blades, each propeller blade having a blade length with a proximal end attached to said propeller hub and a distal end extending radially outward from said propeller hub,
      wherein each of said propeller blades has a chord length that varies in size as a function of a radial position ratio, with a maximum chord length ratio between 0.300 and 0.330,
      wherein each of said propeller blades has a twist angle that decreases from the proximal end to the distal end as a function of the radial position ratio, and
      wherein the twist angle is between 58 and 68 degrees at the proximal end and between 10 and 20 degrees at the distal end.

2. The marine propeller of claim 1, wherein each of said propeller blades has a constant hydrofoil shape along the blade length.

3. The marine propeller of claim 2, wherein said constant hydrofoil shape defines a low pressure side and a high pressure side, the low pressure side having a thickness at its trailing edge that is greater than that of the high pressure side.

4. The marine propeller of claim 1, wherein the marine propeller is a two-bladed propeller consisting of only two propeller blades.

5. The marine propeller of claim 1, wherein the maximum chord length ratio is between 0.307 and 0.322.

6. The marine propeller of claim 1, wherein the twist angle is between 60.5 and 65.5 degrees at the proximal end.

7. The marine propeller of claim 1, wherein the twist angle is between 12.5 and 17.5 degrees at the distal end.

8. The marine propeller of claim 1, wherein each propeller blade comprises a chord line connecting its leading edge to its trailing edge, wherein the twist angle is rotated relative to the propeller hub about a midpoint of the chord line.

9. The marine propeller of claim 1, wherein the propeller hub and the two propeller blades are fabricated as a composite structure.

10. The marine propeller of claim 1, wherein the propeller hub and each of the two propeller blades comprise 6061 aluminum.

11. The marine propeller of claim 4, wherein the distal ends of the two propeller blades face opposite directions and a distance between the distal ends is between 2 and 5 inches.

12. The marine propeller of claim 11, wherein the distance between the distal ends is between 3 and 4 inches.

13. The marine propeller of claim 1, wherein each of said propeller blades has a chord length ratio between 0.252 and 0.280 when the radial position ratio is 0.50.

14. The marine propeller of claim 13, wherein each of said propeller blades has a chord length ratio between 0.312 and 0.316 when the radial position ratio is 0.25.

15. The marine propeller of claim 14, wherein each of said propeller blades has a chord length ratio between 0.147 and 0.176 when the radial position ratio is 0.75.

16. The marine propeller of claim 1, wherein each of said propeller blades has a twist angle between 26.236 degrees and 30.520 degrees when the radial position ratio is 0.50.

17. The marine propeller of claim 16, wherein each of said propeller blades has a twist angle between 40.338 degrees and 49.862 degrees when the radial position ratio is 0.25.

18. The marine propeller of claim 17, wherein each of said propeller blades has a twist angle between 18.497 degrees and 19.952 degrees when the radial position ratio is 0.75.

19. The marine propeller of claim 1, wherein the twist angle is generally defined by $y_1=72.519x^2-132.62x+76.714$, where $y_1$ is the twist angle and x is the radial position ratio.

20. The marine propeller of claim 1, wherein the chord length ratio is generally defined by $y_2=-0.3864x^2+0.1015x+0.3116$, where $y_2$ is the chord length ratio and x is the radial position ratio.

* * * * *